US008420704B2

(12) United States Patent
Hillmyer et al.

(10) Patent No.: US 8,420,704 B2
(45) Date of Patent: Apr. 16, 2013

(54) NANO-STRUCTURED POLYMER COMPOSITES AND PROCESS FOR PREPARING SAME

(75) Inventors: Marc Hillmyer, Minneapolis, MN (US); Liang Chen, Berkeley, CA (US)

(73) Assignee: Regents of the University of Minnesota, Saint Paul, MN (US)

( * ) Notice: Subject to any disclaimer, the term of this patent is extended or adjusted under 35 U.S.C. 154(b) by 345 days.

(21) Appl. No.: 12/669,857

(22) PCT Filed: Jul. 18, 2008

(86) PCT No.: PCT/US2008/070454
§ 371 (c)(1),
(2), (4) Date: Jun. 16, 2010

(87) PCT Pub. No.: WO2009/048663
PCT Pub. Date: Apr. 16, 2009

(65) Prior Publication Data
US 2010/0292077 A1    Nov. 18, 2010

Related U.S. Application Data

(60) Provisional application No. 60/951,063, filed on Jul. 20, 2007.

(51) Int. Cl.
*C08J 9/26*    (2006.01)
*C08L 53/00*    (2006.01)

(52) U.S. Cl.
USPC .................. 521/61; 521/62; 216/56; 216/62; 264/42; 264/48; 264/49

(58) Field of Classification Search .................... 521/61, 521/62; 216/56, 62; 264/42, 48, 49
See application file for complete search history.

(56) References Cited

U.S. PATENT DOCUMENTS

| | | | |
|---|---|---|---|
| 4,963,165 A | 10/1990 | Blume et al. | |
| 5,776,990 A | 7/1998 | Hedrick et al. | |
| 6,458,310 B1 | 10/2002 | Liu | |
| 2003/0222048 A1 | 12/2003 | Asakawa et al. | |

FOREIGN PATENT DOCUMENTS

| EP | 0 154 512 | 9/1985 |
|---|---|---|
| JP | 2002 097289 | 4/2002 |

OTHER PUBLICATIONS

Cavicchi et al. "An ordered nanoporous monolith from an elastomeric crosslinked block copolymer precursor", Macromolecular Rapid Communications, vol. 25, No. 6, Mar. 19, 2004, pp. 704-709, XP002520996 p. 705.
Jae-Suk et al. "Polymerization of monomers containing functional silyl groups. 7. Porous membranes with controlled microstructures", Macromolecules, vol. 22, No. 6, Jun. 1989, pp. 2602-2606, XP002520997 scheme 1.
Zhou et al. "Diblock copolymer nanospheres with porous cores", Macromolecules, vol. 35, No. 9, Apr. 23, 2002, pp. 3690-3696, XP002520998 Scheme 1.
Hedrick et al. "Polyimide nanofoams from caprolactone-based copolymers" Macromolecules, vol. 29, No. 10, May 6, 1996, pp. 3642-3646, XP002520999 Scheme 1.
Charlier et al. "Crosslinked polyimide foams derived from pyromellitic dianhydride and 1, 1-bis (4-aminophenyl)-1-phenyl-2,2,3-trifluoroethane with poly(alpha-methstyrene)", Polymer, vol. 36, No. 6, Mar. 1, 1995, pp. 1315-1320, XP004025917 pp. 1315-1316.
Phillip et al. "Gas and water liquid transport through nanoporous block copolymer membranes", Journal of Membrane Science, vol. 286, No. 1-2, Dec. 15, 2006, pp. 144-152, XP024931612 p. 146.
Database WPI Week 200258, Thomson Scientific, London, GB; AN 2002-541115, XP002521002.
Database Compendex (online) Engineering Information, Inc., New York, NY, 2006, Matsumoto et al., "Synthesis and property of sulfonic-acid-containing cross-linked block copolymer film", 55th SPSJ Annual Meeting 2006 Society of Polymer Science, vol. 55, No. 1, 2006, p. 676, XP002521001, Database accession No. E20064210181547 abstract.
Guo et al. "Influence of 1,2-PB matrix cross-linking on structure and properties of selectively etched 1,2-PB-PDMS block copolymers", Macromolecules, vol. 40, No. 10, May 15, 2007 pp. 3669-3675, XP002521000 p. 3670.
International Search Report and Written Opinion from corresponding PCT Application No. PCT/US2008/070454, dated Apr. 7, 2009, (15 pages).
International Preliminary Report on Patentability from corresponding PCT Application No. PCT/US2008/070454, issued Jan. 26, 2010, (14 pages).

*Primary Examiner* — Irina S Zemel
(74) *Attorney, Agent, or Firm* — Fish & Richardson P.C.

(57) ABSTRACT

A process for preparing a polymer composite that includes reacting (a) a multi-functional monomer and (b) a block copolymer comprising (i) a first block and (ii) a second block that includes a functional group capable of reacting with the multi-functional monomer, to form a crosslinked, nano-structured, bi-continuous composite. The composite includes a continuous matrix phase and a second continuous phase comprising the first block of the block copolymer.

26 Claims, 41 Drawing Sheets

NANO-STRUCTURED POLYMER COMPOSITES AND PROCESS FOR PREPARING SAME

CROSS REFERENCE TO RELATED APPLICATION

This application is a National Stage application under 35 U.S.C. X371 and claims benefit under 35 U.S.C. §119 (a) of International Application No. PCT/US2008/070454 having an International Filing Date of Jul. 18, 2008, which claims the benefit of priority of U.S. Provisional Patent Application Ser. No. 60/951,063, filed on Jul. 20, 2007.

STATEMENT OF FEDERALLY SPONSORED RESEARCH

This application was funded, at least in part, by the U.S. Department of Energy (Grant No. DE-FG02-05ER46261). Accordingly, the federal government may have rights to this application.

TECHNICAL FIELD

This invention relates to polymer composites and processes for preparing same.

BACKGROUND

Block copolymers are versatile hybrid materials that have been used in the preparation of a wide variety of nanostructured materials. The incompatibility of distinct chemical segments leads to nanometer-scale self-organization, and thus utility as structure directing agents.

SUMMARY

In one general aspect, a process for preparing a polymer composite is described that includes reacting (a) a multi-functional monomer and (b) a block copolymer. The block copolymer includes (i) a first block and (ii) a second block that includes a functional group capable of reacting with the multi-functional monomer. From an initially homogeneous state (e.g., where the reactants are dissolved in a non-reactive solvent), the reaction leads to a crosslinked, nano-structured, bicontinuous composite that includes a continuous matrix phase, and a second continuous phase that includes the first block of the block copolymer. As used herein, a "nano-structured, bicontinuous composite" refers to a polymer-polymer composite characterized by two continuous polymer phases interspersed throughout each other that exhibits compositional heterogeneity on a nanometer (i.e., 1-500 nanometer) length scale.

In various implementations, the process may include treating the composite to selectively remove the first block of the block copolymer in the second continuous phase to form a plurality of pores. The composite may be treated by a chemical etchant. The pores may have an average pore diameter of about 1 to about 500 nanometers. The pores may also have an average port diameter of about 10 to about 50 nanometers. The multi-functional monomer may be a multi-functional, ethylenically unsaturated monomer. The multi-functional monomer may include a metathesis-reactive monomer and may be reacted with the second block of the block copolymer in the presence of a metathesis catalyst. The metathesis-reactive monomer may include a cyclic olefin that may be dicyclopentadiene, cyclooctene, or combination thereof. The metathesis catalyst may include a functional-group tolerant metathesis catalyst that may include a second generation Grubbs catalyst. The first block of the block copolymer may be a polylactide block, a sulfonated polystyrene block or combinations thereof. The second block of the block copolymer may include an ethylenically unsaturated functional group that is capable of reacting with the multi-functional monomer. The second block of the block copolymer may also include a norbornenyl group that is capable of reacting with the multi-functional monomer. The second block of the block copolymer may further include a copolymer of styrene and norbornenylethylstyrene. The block copolymer may include a third block. In some embodiments, the multi-functional monomer may be dicyclopentadiene, cyclooctene, combination thereof, and the block copolymer may be a polylactide-poly(styrene-co-norbornenylethylstyrene) block copolymer, a sulfonated polystyrene-poly(styrene-co-norbornenylethylstyrene) block copolymer, a polylactide-poly(dimethyl acrylamide)-poly (styrene-co-norbornenylethylstyrene) block copolymer, or combinations thereof. The process may also include reacting the multi-functional monomer and the block copolymer in the presence of a homopolymer polylactide. In some embodiments, the resultant composite is in the form of a nano-porous or barrier membrane that may be a water purification membrane, ammonia separation membrane or fuel cell membrane.

In another general aspect, a composition is described that includes a crosslinked, nano-structured, bicontinuous composite that includes a continuous matrix phase and a second continuous phase. The continuous matrix phase includes nanometer-sized domains that include a second block of a block copolymer, and the second continuous phase includes a first block of the block copolymer. The composition exhibits good mechanical properties, including modulus, tensile strength, and elongation at break.

In various implementations, the composite may include a plurality of pores. The pores may have an average pore diameter of about 1 to about 500 nanometers. The pores may also have an average port diameter of about 10 to about 50 nanometers. In some embodiments, the composite is in the form of a nano-porous or barrier membrane that may be a water purification membrane, ammonia separation membrane or fuel cell membrane.

In still another general aspect, a composition is described that includes a crosslinked, nano-structured, bicontinuous composite that includes a continuous matrix phase and a second continuous phase. The composite is the reaction product of (a) a multi-functional monomer and (b) a block copolymer that includes (i) a first block and (ii) a second block that includes a functional group capable of reacting with the multi-functional monomer. The second continuous phase includes the first block of the block copolymer.

The polymer nano-composites described herein include two or more distinct phases at a characteristic length of tens of nanometers, which can be facilely produced using multiblock polymers or reactive blending. Block copolymers can not only render nanoscopic arrangement of two polymers, also offer great advantages in optimizing thermal and mechanical properties compared to homopolymers, such as various thermoplastic elastomers from copolymers containing elastic and glassy or semicrystalline blocks, reinforced epoxy resin using copolymer compatibilizers, and micro-structured copolymer/homopolymer blends. More attractively, copolymers having a chemically-tailored block self-assemble into advanced functional membranes, which potentially leads to expansive new applications of these materials, for instance, that one phase are nanopores templated from solvent or a sacrificial block can be applied in nano-separation of gas or liquid, or that one phase is a functional barrier in a reinforced matrix can be applied in catalytic reactions and selective transport. In order to achieve ordered morphology such as bicontinuous structure, conventional synthesis of the aforementioned nanocomposite membranes rely greatly on either the copolymer architecture and composition or processes, which demands effort in material synthesis, particularly if various properties (such as thermal stability, mechanical strength, chemical functionality, solvent stability) are targeted simultaneously. In this disclosure, a simple process is described where a reactive diblock copolymer and a reactive monomer are used. All above variables can be optimized, and moreover not only the copolymer composition but also the copolymer functionality are quite flexible in this process. Consequently, our cocontinuous nanoporous membranes can be used in water filtration as well as various separation and catalytic reactions, cocontinuous proton conductive membranes could play an important role in selective separation of gases and fuel cells. More generally, any compatible functional polymers can be easily incorporated so as to attain thermal and mechanical robustness while maintaining comparable functions.

The details of one or more embodiments of the invention are set forth in the accompanying drawings and the description below. Other features, objects, and advantages will be apparent from the description and from the claims.

DESCRIPTION OF DRAWINGS

FIG. 6(a) compares a non-annealed film (curve 1') to a film subjected to swelling in THF, followed by slow drying (curve 3). FIG. 6(b) compares a non-annealed film (curve 1) with a film annealed at 140° C. for 1 hr (curve 2).

FIG. 7(a) corresponds to the non-annealed films (curves 1 and 1') of FIGS. 6(a) and (b). FIG. 7(b) corresponds to the annealed film of FIG. 6(b) (curve 2). FIG. 7(c) corresponds to the THF-swelled film of FIG. 6(a) (curve 3).

DETAILED DESCRIPTION

Figure 1:
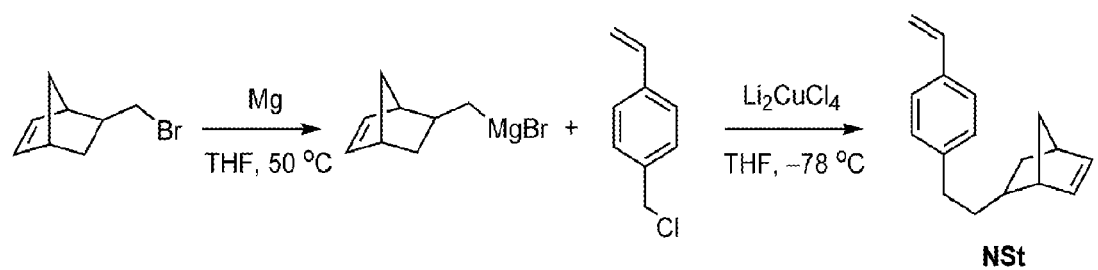
FIG. 1 shows a reaction scheme for synthesizing monomer norbornenylethylstyrene (N).

Polymer composites are prepared by reacting (a) a multi-functional monomer and (b) a block copolymer. The block copolymer includes a first block, and a second block that includes a functional group capable of reacting with the multi-functional monomer. The reaction can take place in the presence of a catalyst, such as a metathesis catalyst (e.g., second generation Grubbs catalyst). The reaction forms a crosslinked, nano-structured, bicontinuous composite that includes continuous matrix phase, and a second continuous phase that includes the first block of the block copolymer. The nano-structured nature of the composite results in films that are optically transparent when viewed with the naked eye. In addition, the films exhibit good mechanical properties, including modulus, tensile strength, and ultimate elongation, that make them useful in a variety of applications.

Examples of suitable multi-functional monomers include monomers containing ethylenically unsaturated functional groups. The multi-functional monomer, for example, can be a metathesis-reactive monomer such as dicyclopentadiene, trimers of cyclopentadiene, cyclohexenylnorbornene, norbornene, substituted norbornenes, cyclooctene, and the like, as well as combinations of these monomers.

In addition to metathesis-induced crosslinking, other reactive functionalities could be utilized. For example, other multifunctional reactive monomers such as epoxies, olefins, acrylates, etc. would be suitable. Photoinitiated polymerizations, as opposed to catalyst-initiated polymerizations could also be used. Block copolymers that contain a block with a suitably reactive group could be prepared and utilized as structure-directing agents.

The block copolymer includes at least one block having a functional group that can react with the multi-functional monomer. Examples of suitable functional groups include ethylenically unsaturated functional groups (e.g., alkenes) and the like. Specific examples of suitable blocks include blocks derived from monomers such as 4-norbornenylethyl-styrene. It is the pendant norbornenyl group that reacts with the multi-functional monomer to form a crosslinked composite film. The block containing the reactive functional group may be in the form of a homopolymer block (i.e., a block formed from a single type of monomer unit) or a copolymer block (e.g., a statistical or alternating copolymer, or even a block copolymer itself, thus resulting in a multiblock polymer). For example, the block may be a copolymer of styrene and 4-norbornenylethyl-styrene.

The block copolymer contains at least one block ("the first block") in addition to the block having the reactive functional group. The first block is preferably chosen such that it is incompatible with polymerized product of the multi-functional monomer. The incompatibility results in polymer induced phase separation ("PIPS") at some point during the crosslinking reaction from the initial homogeneous state, and creating a multi-phase composite having a nano-structured, bicontinuous microstructure in which one of the phases includes the first block.

The reaction preferably is conducted by combining the reactants (i.e., multi-functional monomer and block copolymer) in an unreactive, neutral solvent (i.e., a solvent that does not react with either the reactants or the resulting reaction product). The solvent is capable of acting as a good solvent for both blocks of the block copolymer. Examples include tetrahydrofuran (THF), methylene chloride, toluene, and the like. The amount of solvent is selected to provide a substantially homogeneous reaction mixture lacking any microstructure. In some embodiments, the solvent may be useful for directing the structure and function of the reactants. In addition, reactive solvents (e.g., dicyclopentadiene, styrene, methylmethacrylate, and the like) could be included as well.

In some embodiments, the first block may be selectively removable, e.g., by chemically etching using base or acid. Examples of suitable blocks for this purpose include polylactide ("PLA") block or other polyester blocks. Removal creates a plurality of nano-sized pores. The pores are small (e.g., pore diameters on the order of about 1 to about 500 nanometers, or about 10 to about 50 nanometers). In addition, the pores are characterized by a relatively narrow size distribution, and are substantially homogeneously distributed throughout the film. These features make the nano-porous film particularly useful for applications such as separation membranes.

Other examples of suitable blocks for the first block include ionically conducting blocks or catalytically reactive blocks. The first block can either be a selective barrier for certain transport applications or be chemically converted to a desirable functionality. Representative examples include sulfonated polystyrene blocks such as PSSH, PSSP and PSSL as shown in Example 6 below that may lead to proton conductive phase in a robust matrix. The first block could also be a mechanically robust block for improving the toughness of the resulting films. The first block could itself be a block copolymer having multiple functional groups. For example, one block could be etched and the other block would then remain on the pore walls to provide a desired functionality.

In one embodiment, the block copolymer could be an ABC-type triblock copolymer having a middle ("B") block provided with useful functionality. This triblock copolymer could be used to incorporate a functional precursor block in order, for example, to decorate pores that are formed after removal of the first block by chemical etching. In this embodiment, the "C" block could contain a functional group that reacts with the multi-functional monomer, the "A" block could be chemically etchable, and the "B" block could contain, e.g., a catalytically reactive group, thus creating catalytically active porous membranes. One example of such ABC triblock copolymer is triblock terpolymer PNS-PX-PLA as shown in Example 8 where PX represents a block that contains a specific functionality that render the composite useful for a particular application.

The films prepared in accordance with the invention are useful in a variety of applications, including separation membranes, membranes for water purification, fuel cell membranes, catalytic reactors, nanotemplates, and the like. The nanoscopic, bicontinuous structure that results from the aforementioned process contains interpenetrating domains that both percolate through the entire material. This cocontinuity allows for one mechanically robust phase to support the entire structure and another percolating domain that endows the material with some specific functionality. Generating a nanoporous structure by removal of the functional domain gives a material with a percolating pore structure. Since the pore size distribution is narrow and the pore structure permeates the entire film, such membrane materials are useful as ultrafiltration membranes. Ultrafiltration membranes are useful in a variety of applications including industrial purification processes and removal of bacteria and viruses from water to render it potable. Furthermore, decoration of the pore walls (e.g., via a multiblock scheme described above) with catalytically-active species can render such materials useful as catalytic membrane reactors. Thus separation and chemical conversion operations can be carried out simultaneously. The functional continuous phase can be useful as a proton-conducting phase in proton exchange membranes for applications in direct methanol or hydrogen fuel cells. Gas purification applications of these membranes are envisioned provided the functional phase can be used for selective transport of one or more gaseous species and the mechanically-robust phase is not compromised in the presence of a gas mixture.

EXAMPLES

Example 1

Monomer norbornenylethylstyrene (N) was first synthesized as shown in FIG. 1. Norbornenylmethyl bromide (mainly the endo isomer) was treated with magnesium in THF to form the corresponding Grignard reagent. In the presence of a catalytic amount of $Li_2CuCl_4$, this norbornenylmethyl magnesium bromide (1.15 equiv) was coupled with vinylbenzyl chloride (1 equiv) at −78° C. in THF to produce the p-norbornenylethylstyrene (N) in a conversion of 85%. The $^{13}C$ and $^1H$ NMR spectra of purified N (silica column/hexanes) indicated a product of high purity and all resonances were consistent with the structure.

The synthesis of P(N-s-S)-b-PLA diblock copolymer by RAFT polymerization was performed as follows. Polylactide with an end-attached chain transfer reagent ("PLACTA") (0.3 g, 34 kg $mol^{-1}$), norbornenylethylstyrene ("N") (0.60 mL) and styrene ("S") (0.60 mL) with 1.0 mg AIBN, were dissolved in toluene (1.0 mL) in an air-free flask, followed by freeze-pump-thaw process three times, and then reacted at 70±1° C. for 20 h. All polymers were recovered through precipitation in methanol, dissolved in $CH_2Cl_2$ and reprecipitated in pentane, and dried under vacuum. The resulting block copolymer had an overall molecular weight of 50 kg $mol^{-1}$ and a polydispersity index of 1.4. The P(N-s-S) block contained 30 mol % of N. Other methods for preparing the block copolymer (e.g., anionic polymerization, followed by controlled ring opening polymerization) can be used as well.

Copolymer, dicyclopentadiene ("DCPD") and THF were pre-mixed in a glass vial with stirring and $2^{nd}$ generation Grubbs catalyst dissolved in minimal amount of THF was added. Subsequently, thin films were cast on a silica substrate, and then crosslinked at room temperature for 6 h with slow THF evaporation, followed by annealing at 100° C. for 1 h in air. Degradation of a sample of the resultant film was performed in 0.5 M NaOH solution of a 40/60 (v/v) mixture of MeOH and $H_2O$ at 70° C. for 3 days, and then rinsed with MeOH. Finally, films were dried under vacuum at 50° C.

Scanning electron microscopy (SEM) analysis was performed on a Hitachi S-900 FE-SEM using 3.0 kV accelerating voltage. Prior to SEM analysis, the fractured films were coated with a 1.5 nm thick Pt layer via direct Pt sputtering.

FT-IR spectra were recorded on a Nicolet Magna-Infrared Spectrometer 550. IR analysis was performed on free-standing films as produced.

Thermogravimetric analysis (TGA) was performed on a Perkin-Elmer TGA 7 instrument under air.

The $N_2$ adsorption experiment was conducted on a Micromeritics ASAP 2000 instrument.

For tensile tests, all films were measured on a Rheometric Scientific MINIMAT instrument at room temperature, operating at a crosshead speed of 1 mm/min. Films before and after degradation were cut into a dogbone shape (1.0 cm long) and measured three times.

Figure 2:
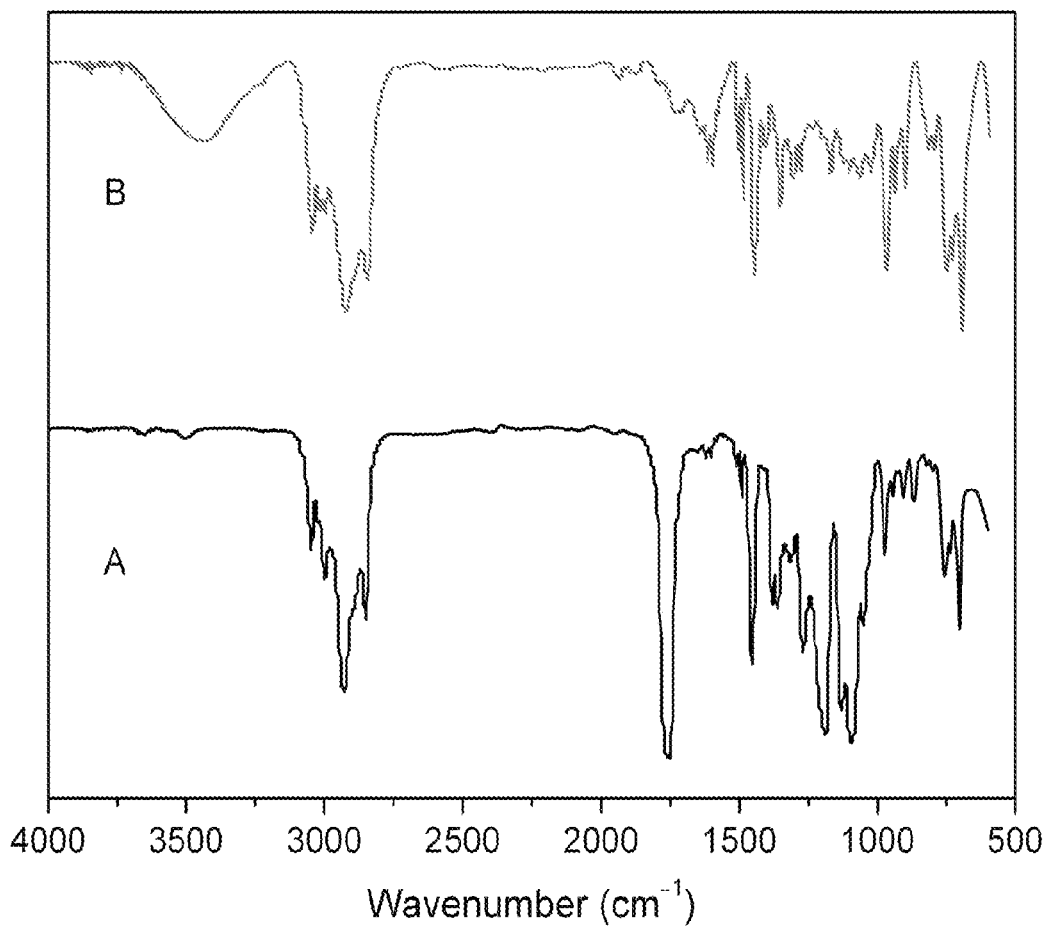
FIG. 2 shows Fourier transform infrared (FT-IR) spectra of a crosslinked PNS-PLA/DCPD film before PLA etching (A) and after PLA etching (B).

The crosslinked films were optically clear both before and after PLA etching. The IR spectra of crosslinked films before (Spectrum A) and after PLA etching (Spectrum B) are shown in FIG. 2. The peak appearing at 1700 $cm^{-1}$, corresponding to the sample prior to PLA etching, is indicative of the carbonyl group from the PLA block. This peak is missing from Spectrum B, corresponding to the film following PLA etching.

Figure 3:
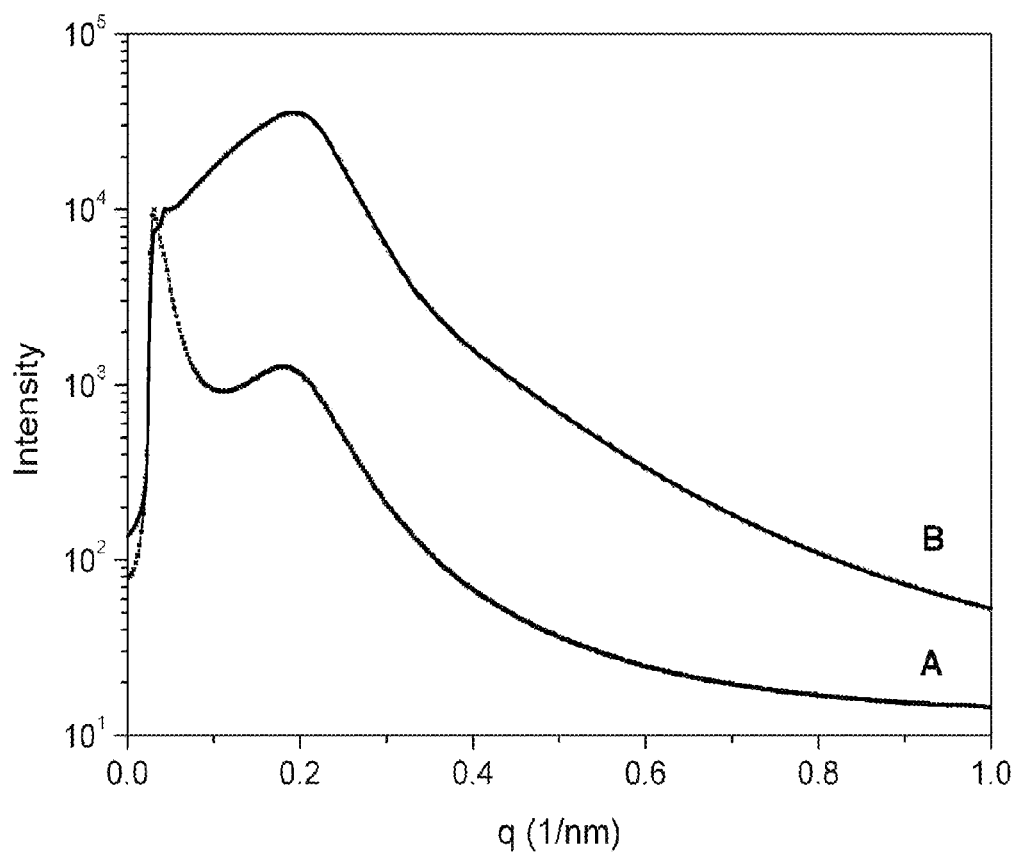
FIG. 3 is a synchrotron small angle X-ray scattering (SAXS) pattern of a crosslinked PNS-PLA/DCPD film before PLA etching (A) and after PLA etching (B).

FIG. 3 is an SAXS profile of the crosslinked film before PLA etching (A) and after PLA etching (B). The SAXS data are consistent with a microphase separated, but disordered structure with a principal length scale of about 35 nm.

Figure 4:
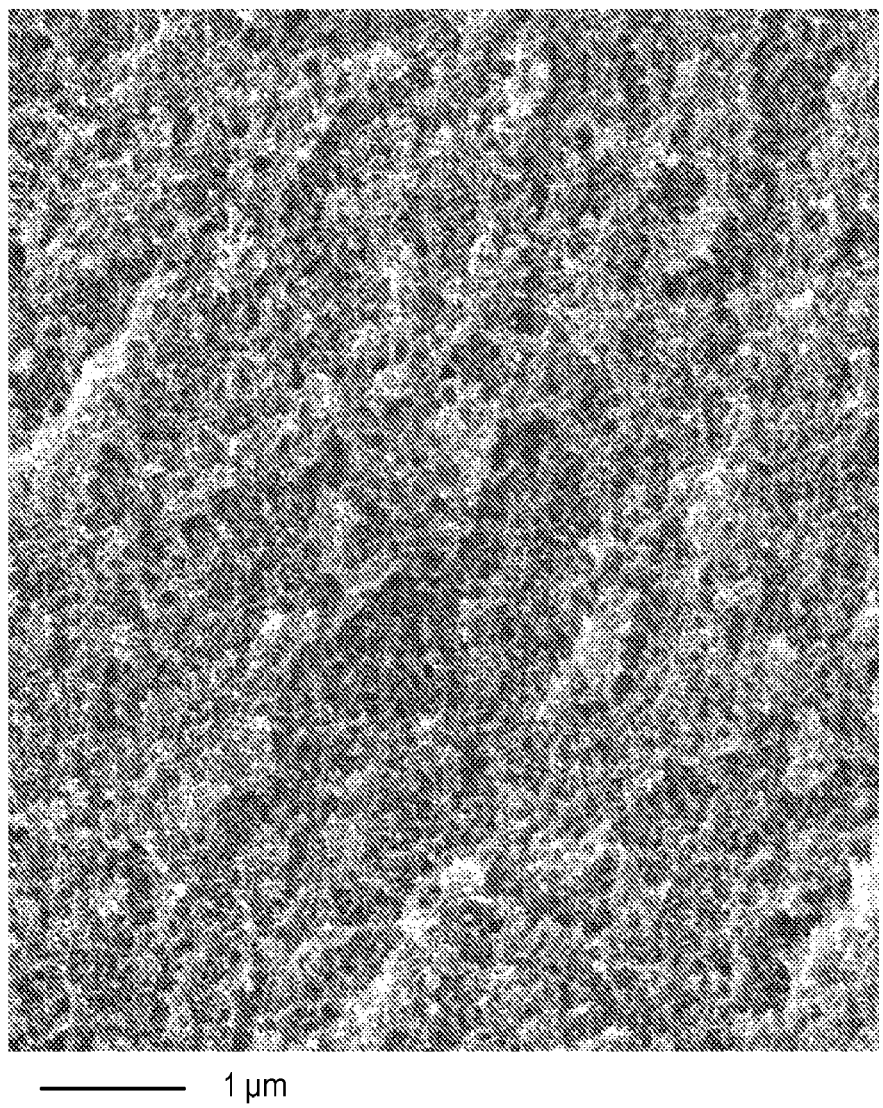
FIG. 4 is a scanning electron microscopy (SEM) microphotograph of a freeze-fractured crosslinked PNS-PLA/DCPD film after PLA etching. Surfaces were sputter coated with platinum to prevent charging.

FIG. 4 is an SEM microphotograph of a freeze-fractured film after PLA etching. The image is consistent with a bicontinuous structure containing percolating pores. The average pore diameter estimated from the SEM image was about 20 nm, which is consistent with the SAXS data presented in FIG. 2. The porous regions were likely templated by the PLA domains, given that the SAXS profile of the film before PLA degradation was essentially identical to its profile after degradation. However, the scattered intensity in the film after PLA degradation was significantly greater than the film prior to PLA degradation, consistent with the increased electron density contrast.

Figure 5:
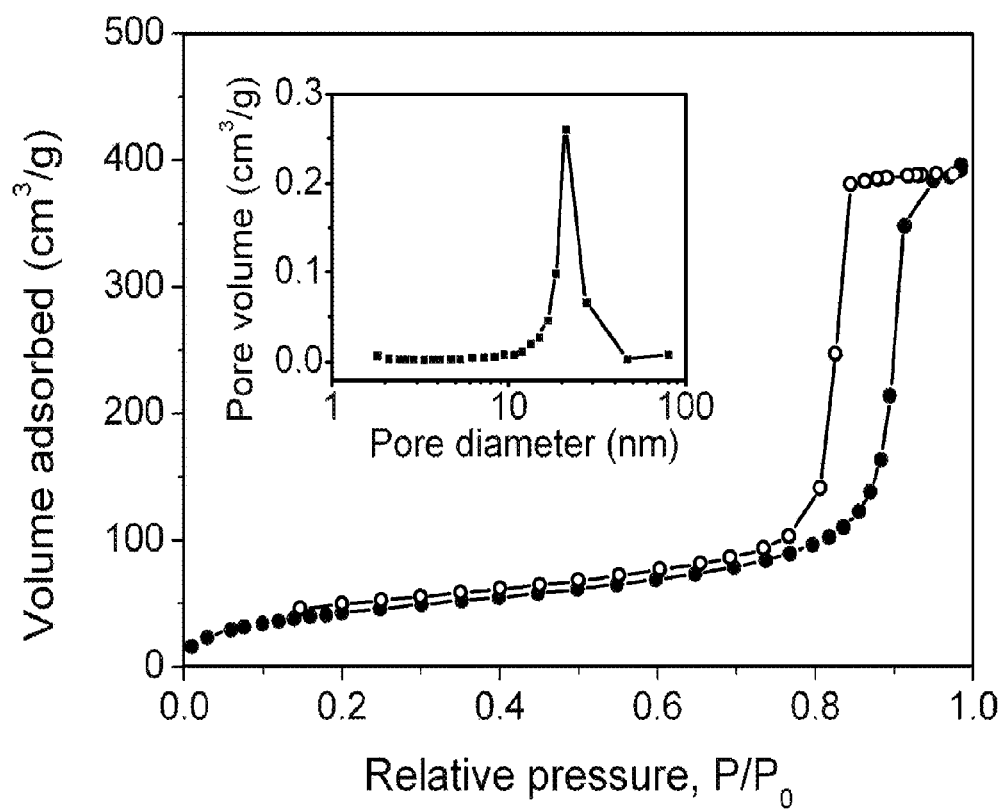
FIG. 5 is a graph illustrating the nitrogen adsorption properties of a crosslinked PNS-PLA/DCPD film after PLA etching.

Nitrogen adsorption experiments, the results of which are illustrated in FIG. 5, confirmed the mesoporosity of the film after PLA etching. BET analysis shows a type IV isotherm and gave a specific surface area of 160 m²g⁻¹. BJH analysis gave a peak pore diameter of 20 nm, and average pore diameter of 17 nm, and a peak width at half height of 7 nm.

Figure 6:
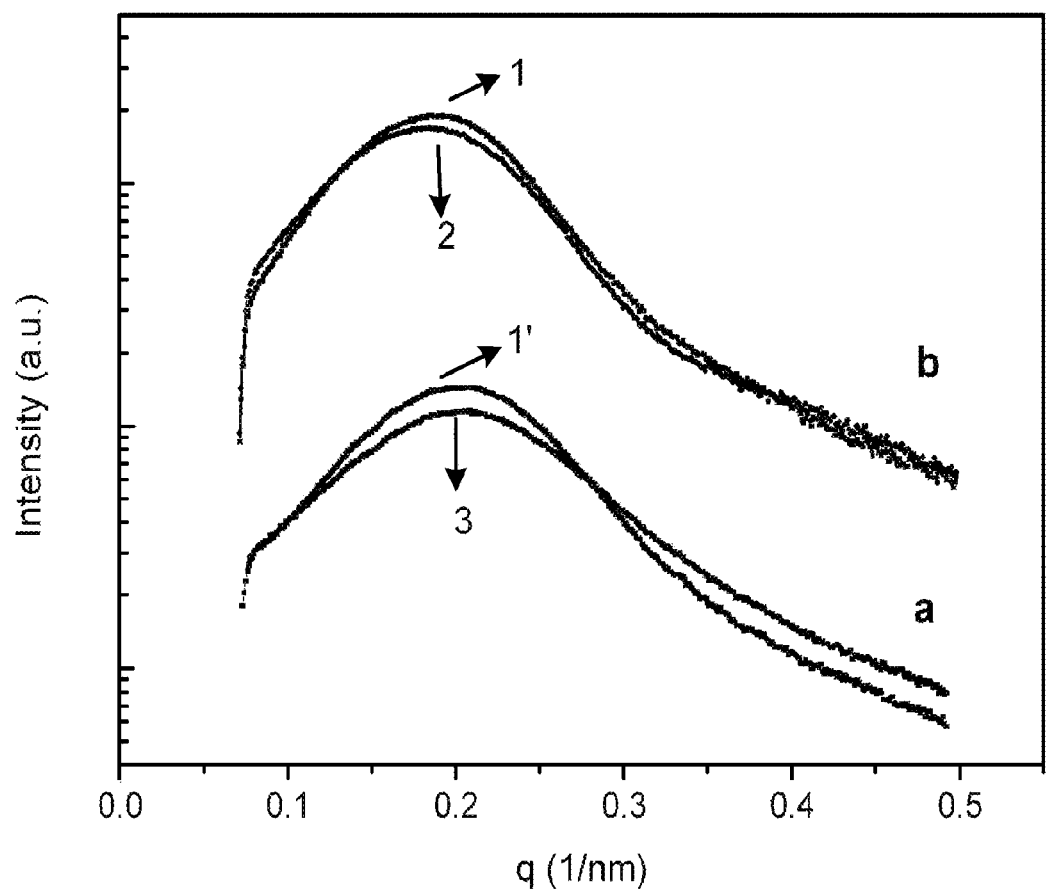
FIGS. 6(a) and 6(b) are SAXS profiles of crosslinked PNS-PLA/DCPD films after PLA etching.
Figure 7:
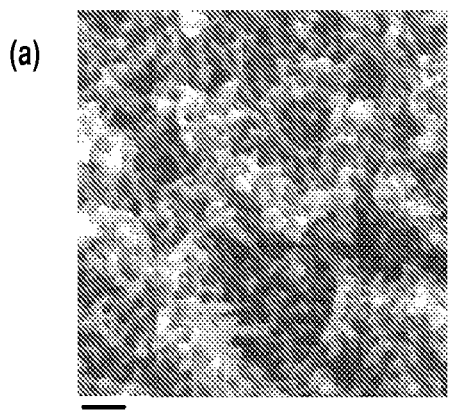
FIGS. 7(a), 7(b), and 7(c) are SEM microphotographs corresponding to 3 freeze-fractured crosslinked PNS-PLA/DCPD films after PLA etching (the length scale bars represent 100 nm).
Figure 7:
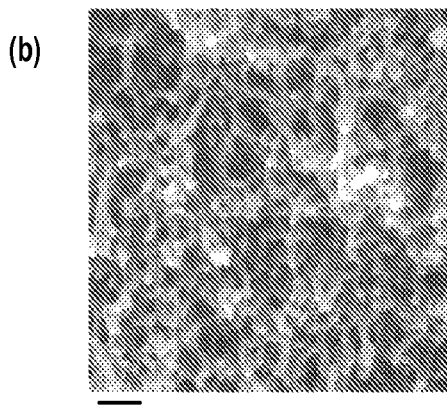
Figure 7:
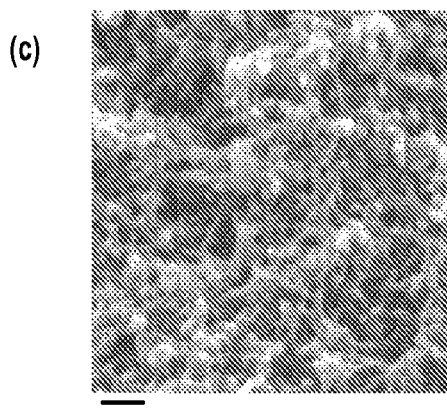
Figure 8:
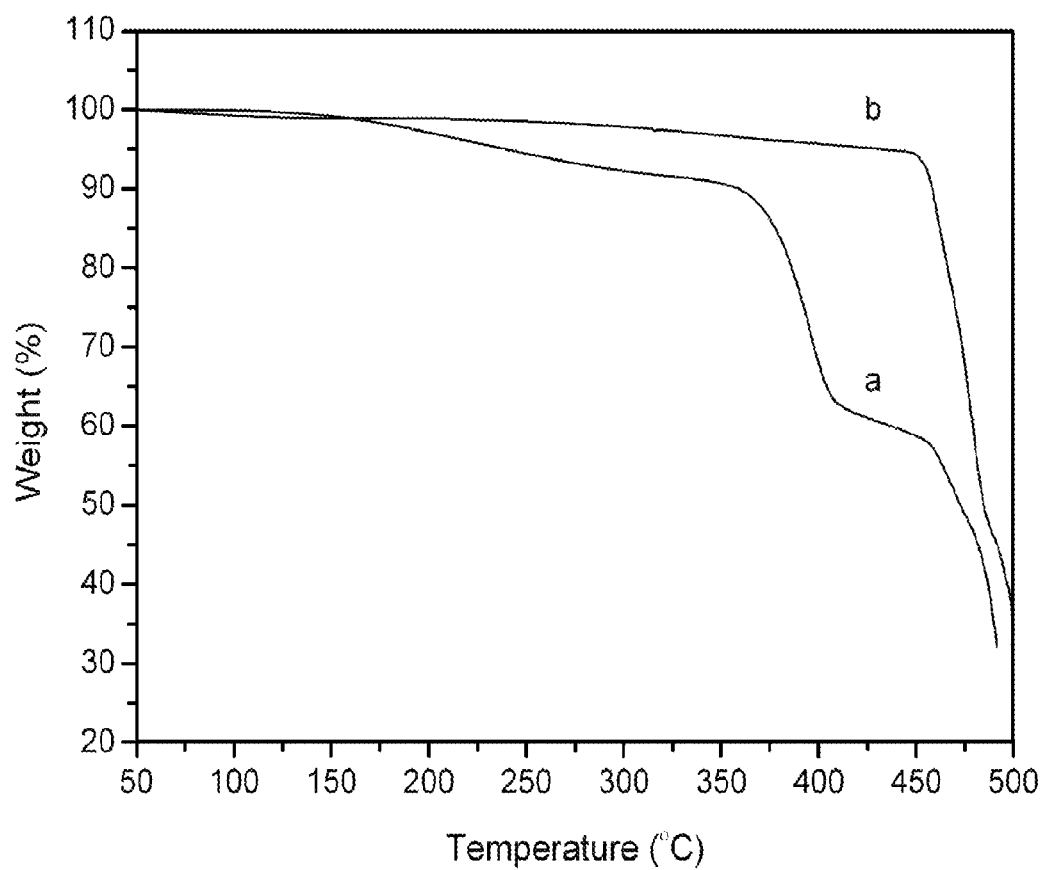
FIG. 8 reports thermogravimetric analysis (TGA) of crosslinked PNS-PLA/DCPD films before PLA etching (a) and after PLA etching (b).

The nanoporous films retained their structure after holding at 140° C. for 1 h or after swelling in THF (followed by slow drying), as shown in the SAXS profiles provided in FIGS. 6(a) and 6(b), and the SEM microphotographs provided in FIGS. 7(a), (b), and (c). The nanoporous films also retained greater than 95% of their mass up to 450° C. upon heating under nitrogen, as illustrated by the thermogravimetric analysis (TGA) results presented in FIG. 8. Combined, these data are consistent with the formation of a robust thermosetting polymer with nanopores templated by the PLA-b-P(N-s-S) block copolymer. The inclusion of the reactive norbornene-containing block resulted in control of the PIPS process, leading to nanoscopic organization of the PLA segments in the polyDCPD/poly(N-s-S) composite.

Figure 9:
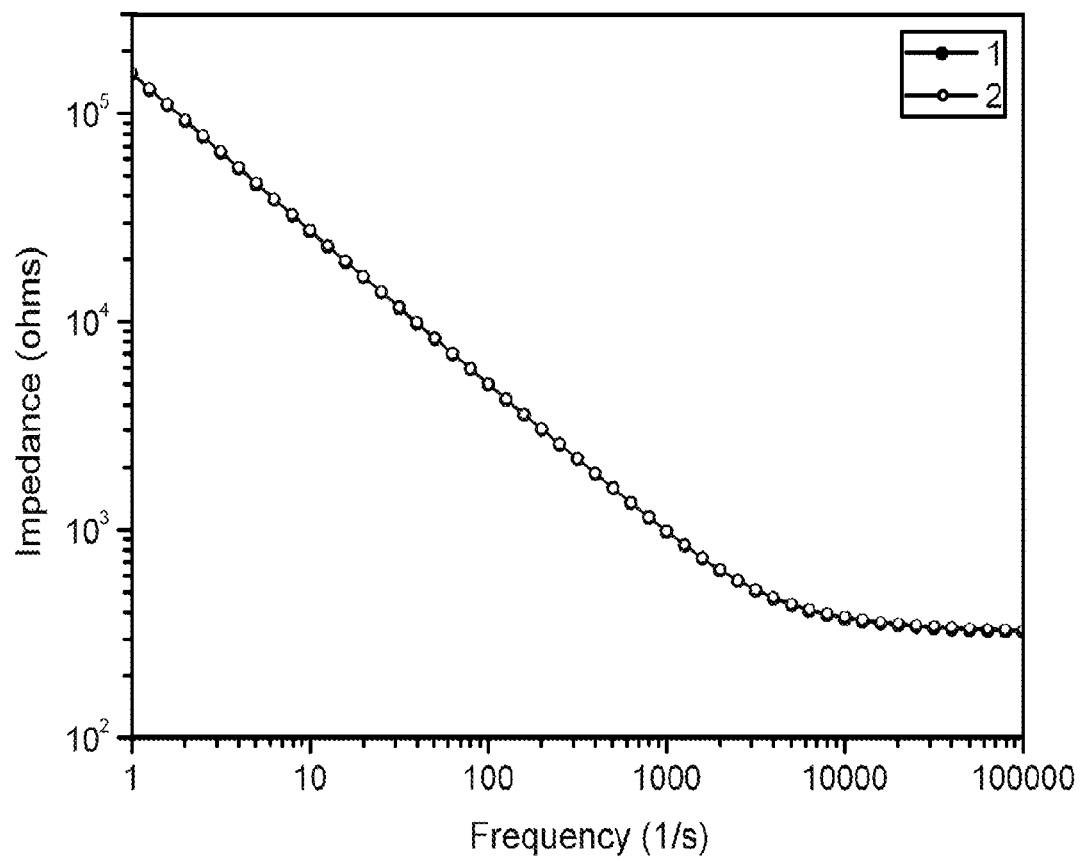
FIG. 9 is a graph of impedance versus frequency for a crosslinked PNS-PLA/DCPD membrane filled with an ionic liquid after PLA etching. A sample film size measuring 3.6 mm×3.0 mm×0.51 mm was used. The sample exhibited an impedance of 335 ohms. The ionic conductivity of the liquid-filled membrane was $1.49 \times 10^{-3}$ S cm$^{-1}$, calculated from 1.058 times cell constant divided by resistance.

For use as separation membranes, the nanoporous films preferably should exhibit robust mechanical properties and a percolating pore structure. To demonstrate the porosity in a macroscopic measurement, the nanoporous films were filled with an ionic liquid and the ionic conductivity of the liquid determined across a 510 μm film by AC impedance spectroscopy. The results are shown graphically in FIG. 9. An ionic conductivity of $1.49 \times 10^{-3}$ S cm⁻¹ was measured. This conductivity compares well to the pure ionic liquid ($9.0 \times 10^{-3}$ S cm⁻¹), accounting for a calculated porosity (i.e. the ratio of the void volume to total sample volume) of 0.41 and a tortuosity of 2.48. These data confirm that the bicontinuous structure percolates through the entire film.

Figure 10:
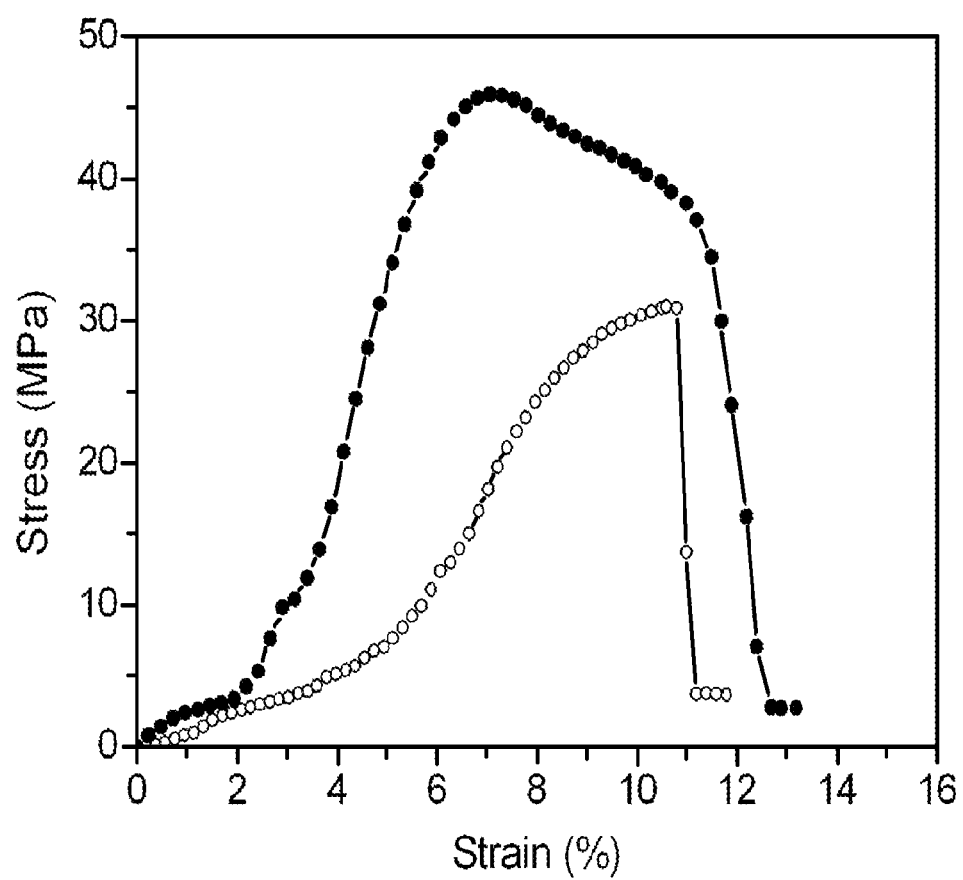
FIG. 10 is a graph of stress versus strain for crosslinked PNS-PLA/DCPD membranes before PLA etching (filled circles) and after PLA etching (open circles).

Dogbone samples of the film before and after PLA removal were subjected to mechanical testing. The results are shown in FIG. 10. The ultimate elongation of the nanoporous membrane (11%) was almost the same as the film prior to PLA etching, and the tensile strength was 32 MPa. These values compare favorably to nanoporous membrane materials such as polycarbonate track etch membranes.

Example 2

Figure 11:
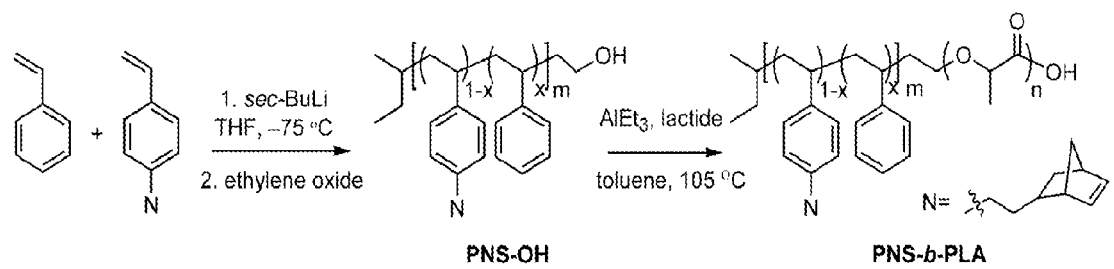
FIG. 11 shows a reaction scheme for producing P(N-S)-b-PLA.

In order to produce norbornene-functional PS-PLA copolymers on a larger scale, an alternative simple way was used to produce P(N-S)-b-PLA by anionic copolymerization of styrene (4.5 g) and N (3.5 g), which was later end-capped with ethylene oxide, and followed by ring opening polymerization of lactide as shown in FIG. 11. Resulting polymers are summarized in Table 1.

TABLE 1

PNS-PLA copolymers.

| Polymer | Mn (kg mol⁻¹) NMR | PDI | $f_{PLA}$ (%) NMR |
|---|---|---|---|
| P(N-S)-OH | 27.5 | 1.20 | — |
| P(N-S)-PLA_1 | 70.2 | 1.31 | 0.61 |
| P(N-S)-PLA_2 | 92.6 | 1.43 | 0.71 |
| PLA_1 | 35.3 | 1.28 | 1 |

In order to analyze the effects of catalyst concentration on the structure of PNS-PLA/DCPD films, three PNS-PLA/DCPD films were prepared as described above with catalyst concentrations at 0.047, 0.63 and 5.0 weight percent relative to the PNS-PLA and DCPD. Table 2 summarizes the casting solutions for these films.

TABLE 2

Casting solutions and domain spacing for films with varied catalyst loadings.

| Sample | Catalyst wt % | PNS-PLA 1-2 (27k/65k) mg | DCPD mg | THF mL | Before etching q (nm⁻¹) | Before etching d (nm) | After etching q (nm⁻¹) | After etching d (nm) |
|---|---|---|---|---|---|---|---|---|
| C1 | 0.047 | 209 | 108 | 1.1 | 0.166 | 37.8 | 0.168 | 37.4 |
| C2 | 0.63 | 197 | 103 | 1.2 | 0.137 | 45.9 | 0.161 | 39.0 |
| C3 | 5.0 | 203 | 105 | 1.2 | 0.149 | 42.2 | 0.141 | 44.6 |

Figure 12:
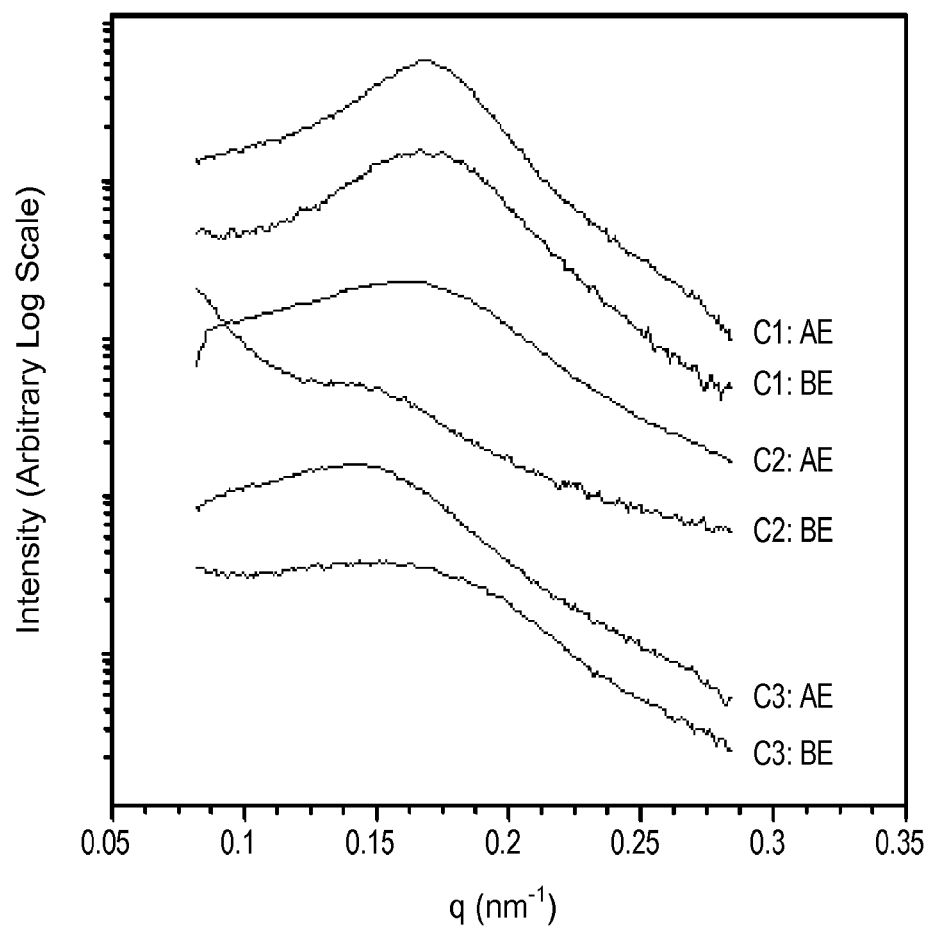
FIG. 12 shows SAXS patterns for crosslinked PNS-PLA/DCPD films with varied catalyst loadings (C1-C3) taken at room temperature both before etching (BE) and after etching (AE) the PLA.

The morphology of the films prepared was characterized using SAXS (FIG. 12). Prior to etching the PLA, only a single broad peak was observed in each sample. The presence of this peak is consistent with a microphase-separated structure. Upon removal of the PLA the intensity of the peak increased indicative of a larger electron contrast between the domains, which is consistent with the formation of a porous structure. Additionally, the domain size of the structure was determined from the principal peak.

Figure 13:
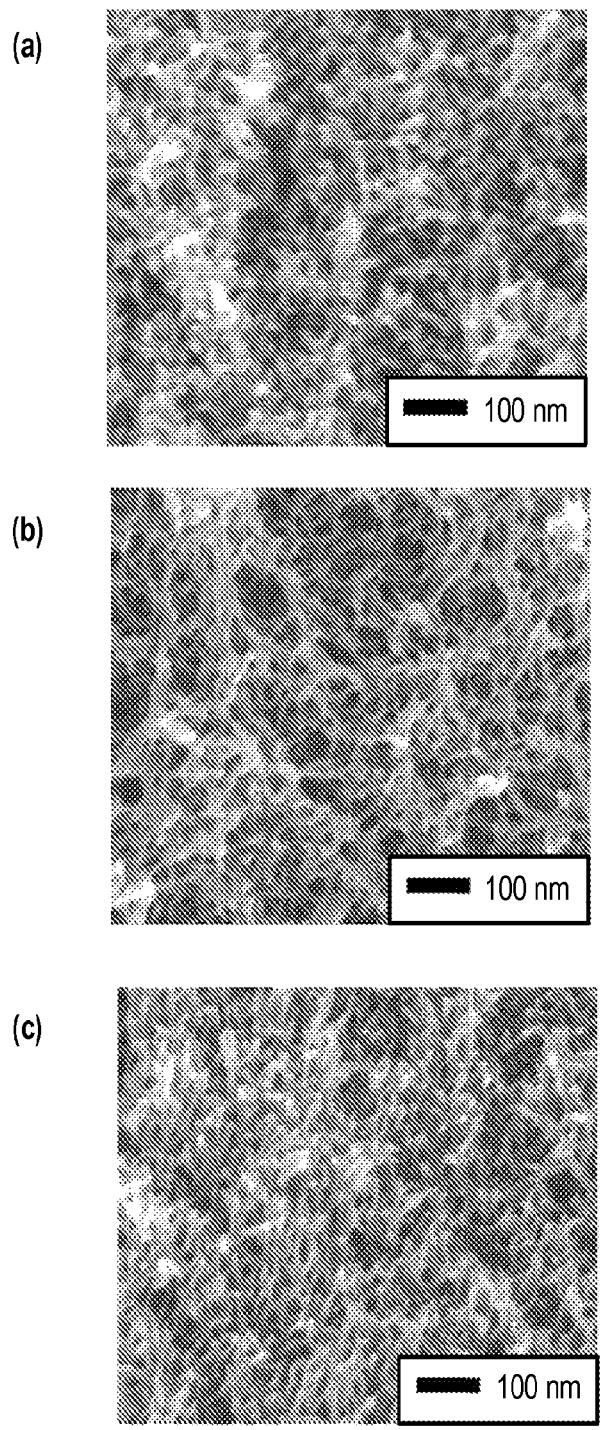
FIG. 13 shows SEM micrographs of fractured surfaces of crosslinked PNS-PLA/DCPD films with (a) 0.047 weight percent catalyst (C1), (b) 0.5 weight percent catalyst (C2) and (c) 5.0 weight percent catalyst (C3) after removal of the PLA. Surfaces were sputter coated with platinum to prevent charging.

In addition to SAXS, the films were imaged using SEM. FIG. 13 shows representative micrographs of PNS-PLA/DCPD films with varied catalyst loadings (C1-C3) after etching. Based on the SAXS analysis and the SEM micrographs, all three films (C1-C3) formed a bicontinuous microphase separated structure.

Example 3

In order to examine the possibility of changing the domain and pore size without adjusting the block copolymer size, six PNS-PLA/DCPD films were prepared as described in Example 2 with PLA homopolymer from 0 to 36 weight percent relative to the PN/S-b-PLA, PLA and DCPD, and analyzed using SAXS. Table 3 provides the casting solution compositions and domain spacing of the films.

TABLE 3

Casting solutions and domain spacing for PNS-PLA/DCPD films with added homopolymer PLA.

| Sample | PNS-PLA | Homo-PLA | | | | Before etching | | After etching | |
|---|---|---|---|---|---|---|---|---|---|
| ($H_{PLA}$ wt %) | (27k/65k) mg | DCPD mg | $M_n$ = 35k mg | Cat. wt % | THF mL | q ($nm^{-1}$) | d (nm) | q ($nm^{-1}$) | d (nm) |
| B1 (0) | 197 | 103 | 0 | 0.63 | 1.2 | 0.137 | 45.9 | 0.161 | 39 |
| B2 (8) | 203 | 107 | 26 | 0.57 | 0.9 | 0.147 | 42.7 | 0.137 | 45.8 |
| B3 (13) | 206 | 103 | 48 | 0.45 | 1.0 | 0.133 | 47.2 | 0.135 | 46.5 |
| B4 (20) | 202 | 102 | 74 | 0.48 | 1.1 | 0.125 | 50.5 | 0.125 | 50.5 |
| B5 (25) | 199 | 103 | 102 | 0.37 | 1.2 | 0.115 | 54.6 | 0.097 | 65.0 |
| B6 (36) | 210 | 127 | 191 | 0.23 | 1.5 | NA | NA | NA | NA |

Figure 14A:
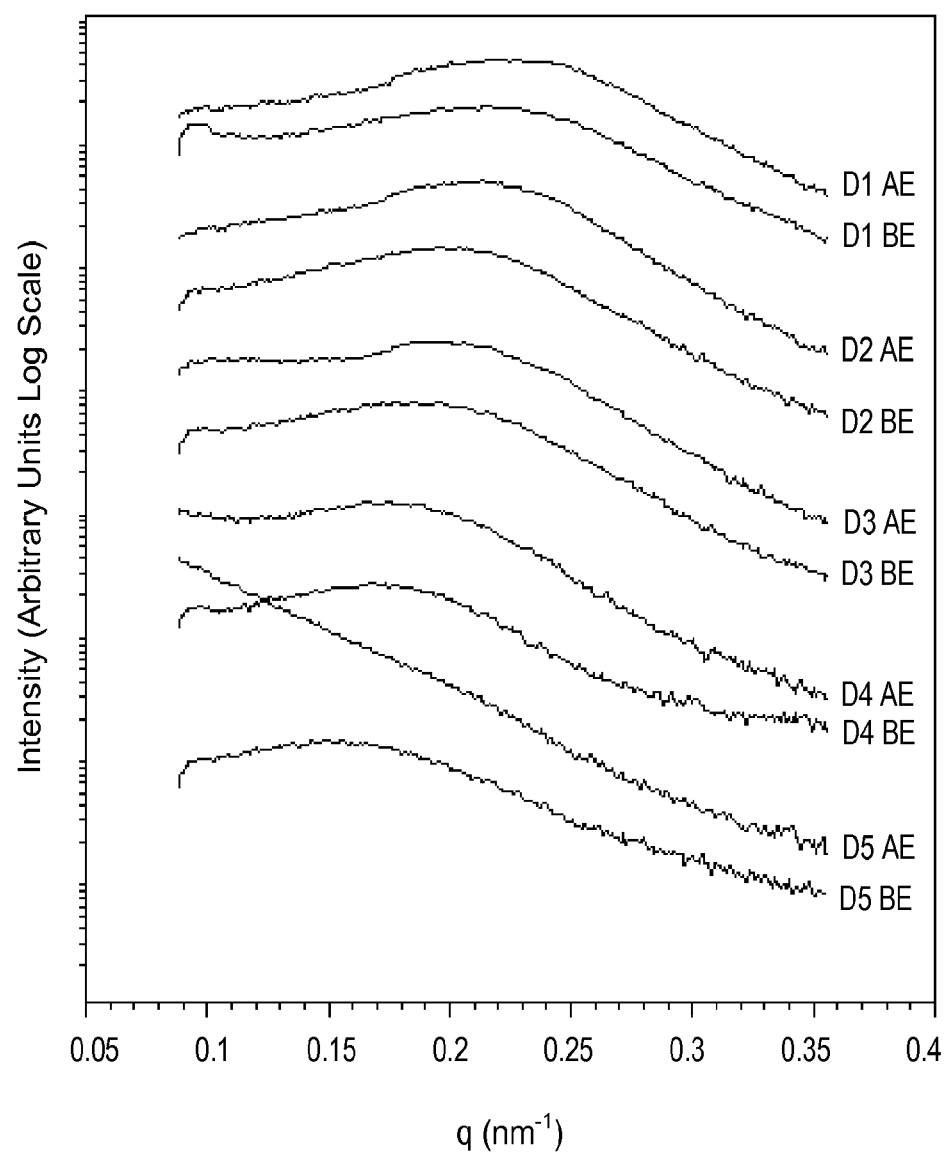
FIG. 14(a) shows SAXS patterns of selected crosslinked PNS-PLA/DCPD films with blended homopolymer PLA both before (BE) and after etching (AE) the PLA.
Figure 14B:
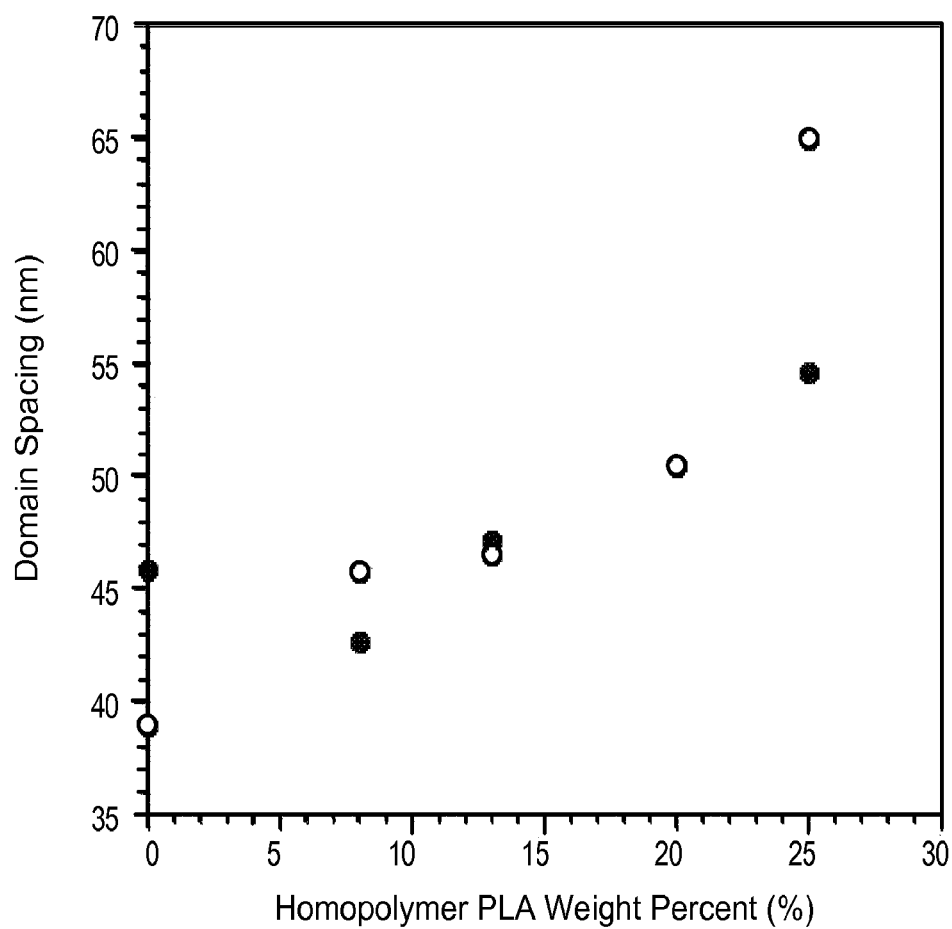
FIG. 14(b) is a plot of domain spacing from SAXS analysis versus homopolymer PLA weight percent (solid circles are samples before etching the PLA, and open circles are samples after etching the PLA).
Figure 15A:
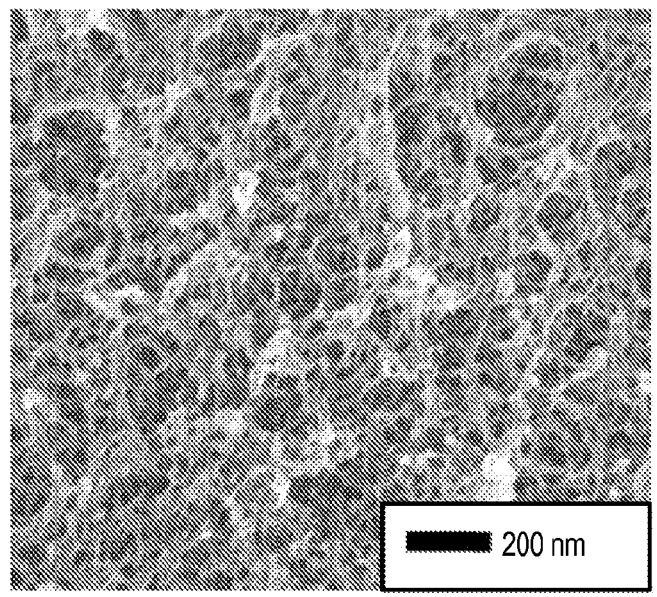
FIG. 15 shows SEM micrographs of fractured surfaces of PNS-PLA/DCPD films with (a) no added homopolymer PLA (B1), (b) 8 weight percent of added homopolymer PLA (B2), (c) 13 weight percent of added homopolymer PLA (B3), (d) 20 weight percent of added homopolymer PLA (B4), (e) 25 weight percent of added homopolymer PLA (B5), and (f) 36 weight percent of added homopolymer PLA (B6) after PLA hydrolysis. Surfaces were sputter coated with platinum to prevent charging.
Figure 15B:
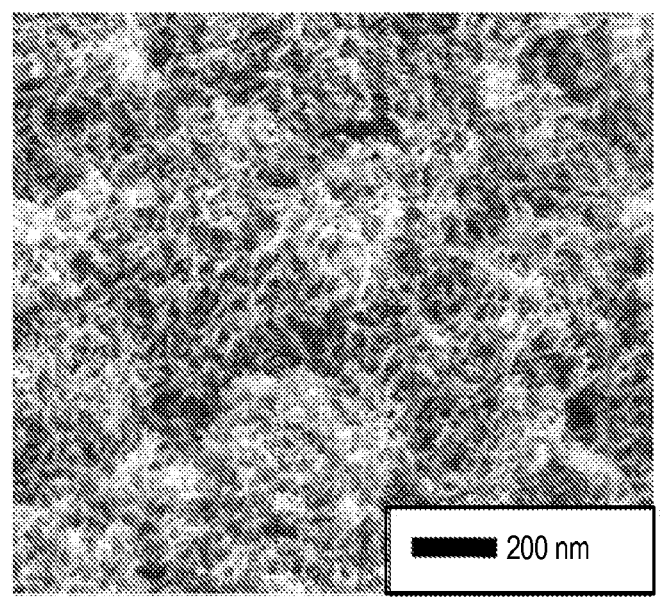
Figure 15C:
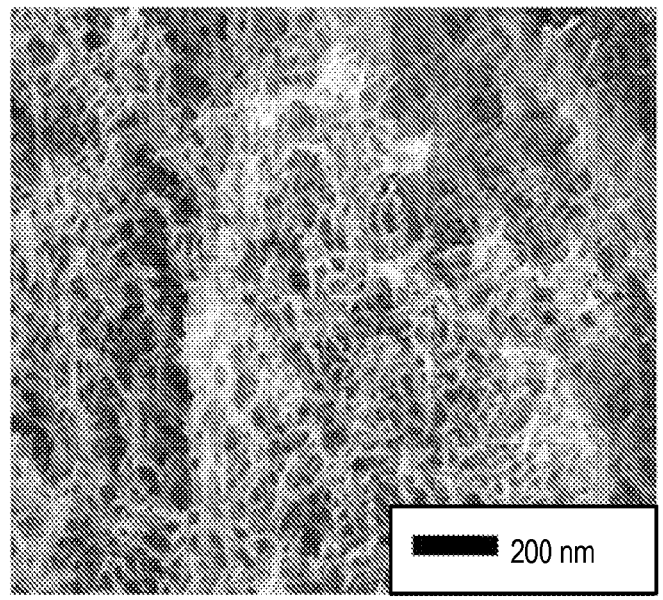
Figure 15D:
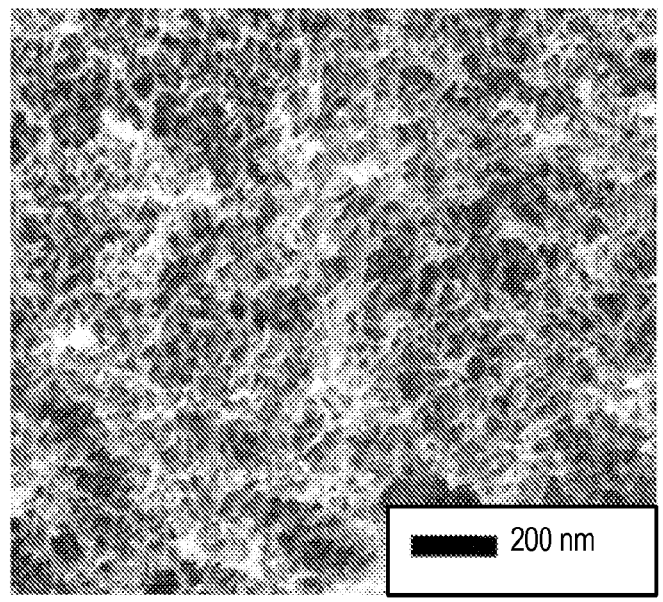
Figure 15E:
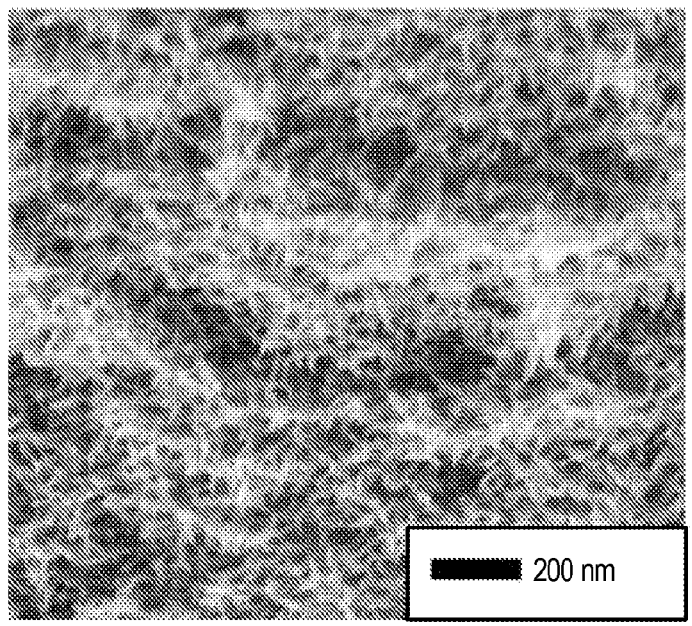
Figure 15F:
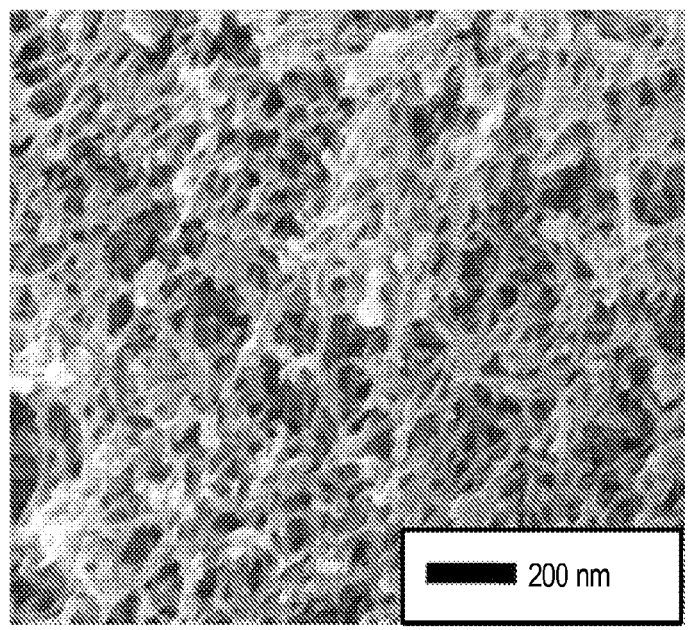

SAXS analysis indicated an increase in domain size with increased homopolymer PLA weight percent as shown in FIG. 14. The domain size of B6 after etching could not be determined as its peak was obscured by the beam stop of the SAXS instrument. SEM micrographs showed a bicontinuous structure among all the films and indicated an increasing pore size as well. Representative micrographs are shown in FIG. 15.

The above results indicate that blending up to 36 weight percent of homopolymer PLA may swell the PLA domains without compromising the bicontinuous nature of the PNS-PLA/DCPD films, thereby providing a simple way for adjusting the pore size of the films.

Example 4

Figure 16:
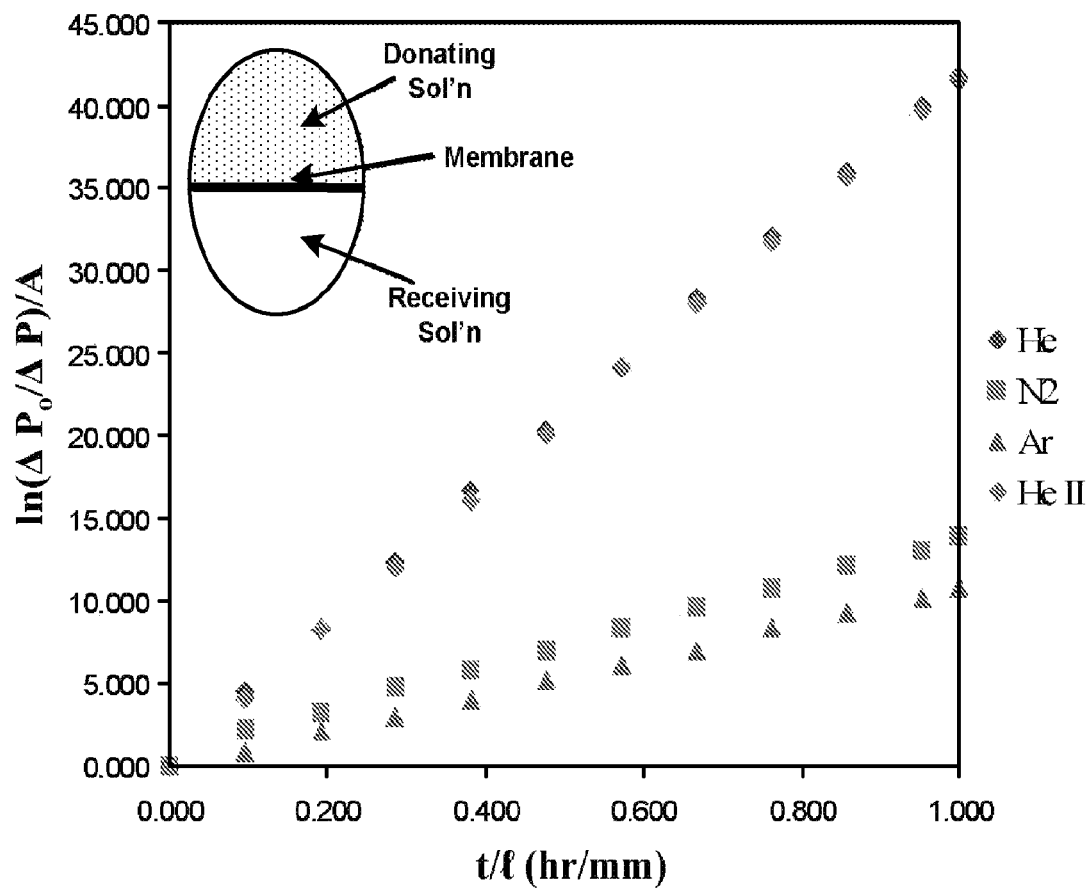
FIG. 16 shows gas diffusion measurements for PNS-PLA/DCPD membranes.

Gas diffusion measurements (FIG. 16) were made on a set of PNS-PLA/DCPD nanoporous membranes with a 23 nm average pore size (BET). A thin skin layer of as-cast membranes was removed by O2 plasma. The block copolymer-based membranes were prepared as described in Example 2. From the measured absolute permeabilities of He, $N_2$, and Ar, effective diffusion coefficients and separation factors for these gases were extracted (accounting for a porosity of 0.40 and an estimated tortuosity of 2.29) consistent with simple Knudsen theory using an average pore diameter of 23 nm.

Figure 17:
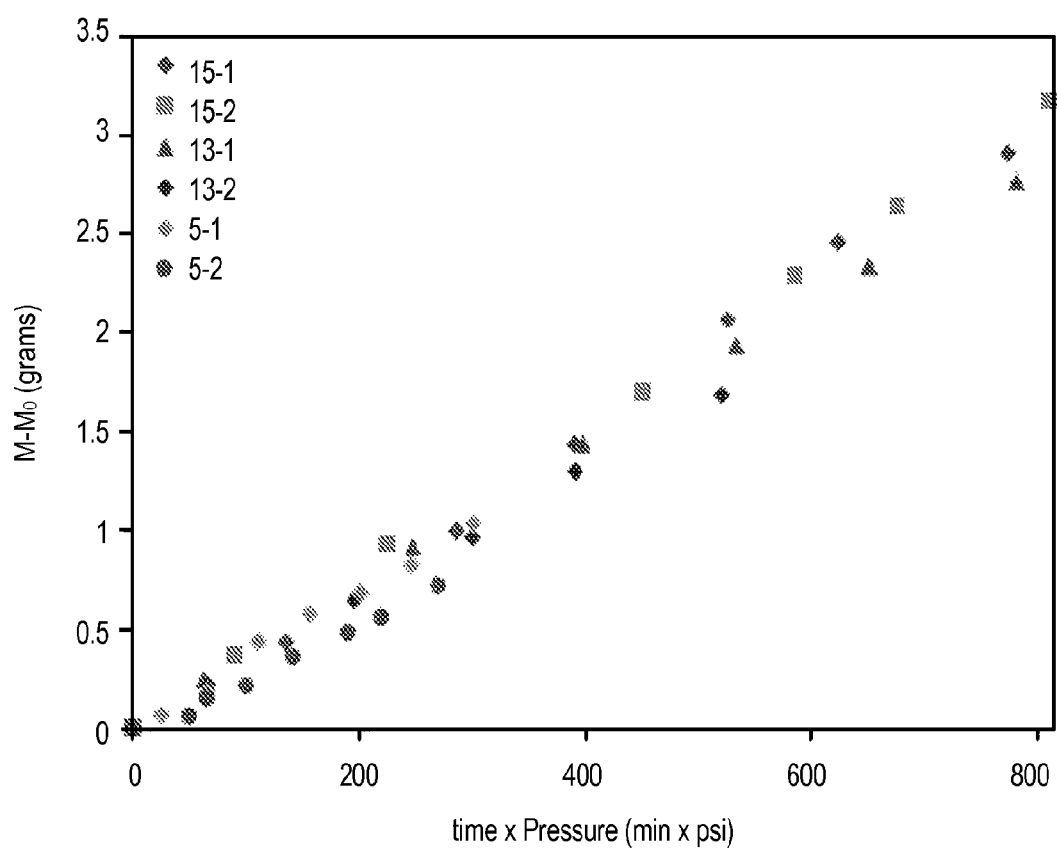
FIG. 17 shows water diffusion measurement for PNS-PLA/DCPD membranes. Numbers 5, 13, and 15 denote the operating pressure (unit of psi) in the measurements.

Water diffusion measurement (FIG. 17) was also conducted on the PNS-PLA/DCPD mesoporous membranes at various operating pressures. Fitting the mass flow rate to the pressure drop suggested a flow rate between hexagonally-packed cylindrical nanopores and randomly packed nanometer-sized spheres, consistent with the 3-dimensional percolated mesoporous structure.

In the crosslinking process, the catalyst loading ranged from 0.05 wt % to 5 wt % to the overall mass of copolymer and DCPD, and no significant effect on the mesoporous structure was observed, although with a high catalyst loading the crosslinked membrane became more rigid. Additionally, it was demonstrated that the pore size could be simply tuned by blending some PLA homopolymer (shown in Table 3) in the crosslinkable mixture. In resultant membranes, SAXS analysis indicated an increase in domain size to 50% with increasing the weight ratio of PLA to copolymer to 25%.

Figure 18:
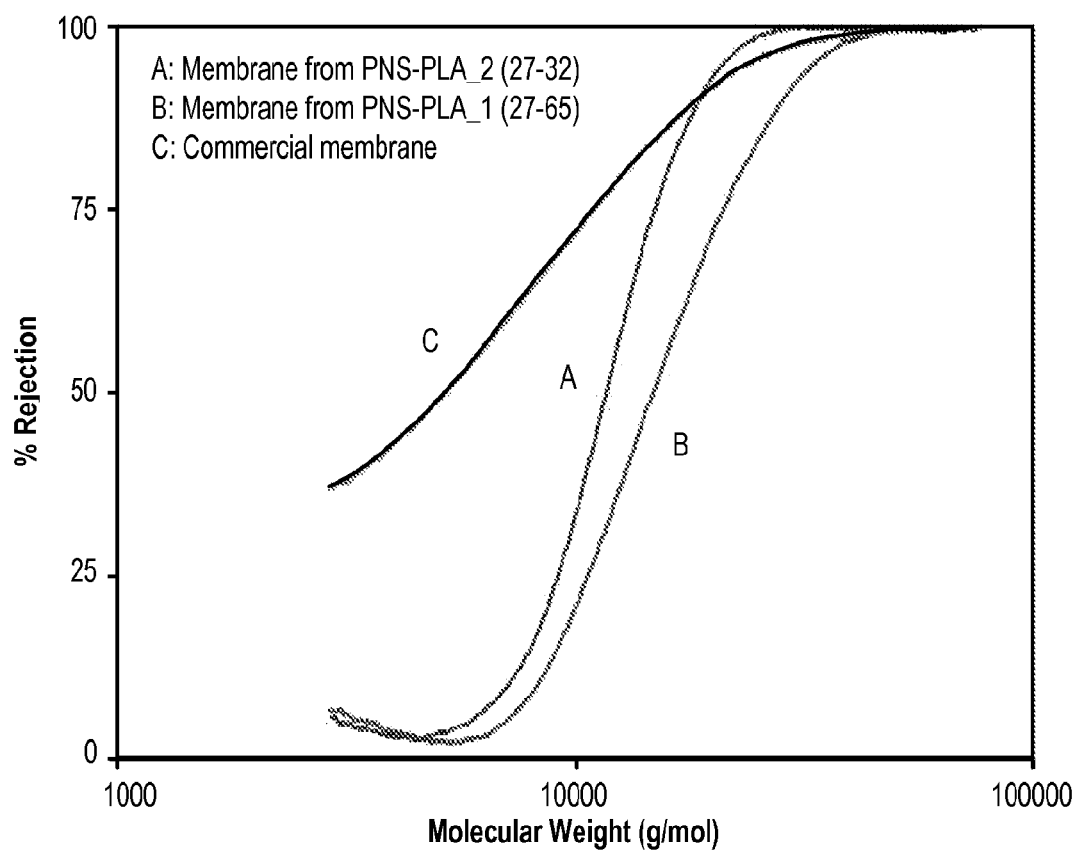
FIG. 18 shows molecular weight cutoff (MWCO) curves for a membrane cast from P(N-S)-b-PLA_1 (B) and P(N-S)-b-PLA_2 (A) along with a commercial membrane (C).

The molecular weight cut off (MWCO) of a membrane cast from P(N-S)-b-PLA_1 (B) and P(N-S)-b-PLA_2 (A) was measured according to ASTM E 1343-90, "Standard Test Method for Molecular Weight Cutoff Evaluation of Flat Sheet Ultrafiltration Membranes." The membrane was challenged with a dextran solution with molecular weights ranging from $1 \times 10^3$ to $1 \times 10^6$ g/mol. The resulting MWCO curve for the membrane is shown in FIG. 18, along with a commercial ultrafiltration membrane (C). While the block copolymer templated membrane had a sharper MWCO curve, the flux of the membrane was an order of magnitude less than the commercial membrane. The sample membrane had a flux of 74.9 $hr^{-1}$ $MPa^{-1}$ $m^{-2}$, while the commercial membrane had a flux of 1070 L $hr^{-1}$ $MPa^{-1}$ $m^{-2}$. The lower flux of the sample membrane may be due to the relative thickness of its active barrier, as the flux across a membrane depends inversely on the thickness of the membrane. The barrier layer for the sample membrane is the thickness of the entire membrane, which in this case was 120 μm. Since the commercial membrane is an asymmetric membrane, its barrier layer is much thinner and likely less than 1 μm.

One of the largest hindrances to flux for all membranes is fouling. Fouling significantly reduces the flux across a membrane as organic matter in the feed solution adsorbs on the surface and pores of the membrane. The adsorption of material onto the membrane requires the continual cleaning or replacement of membranes.

Figure 19:
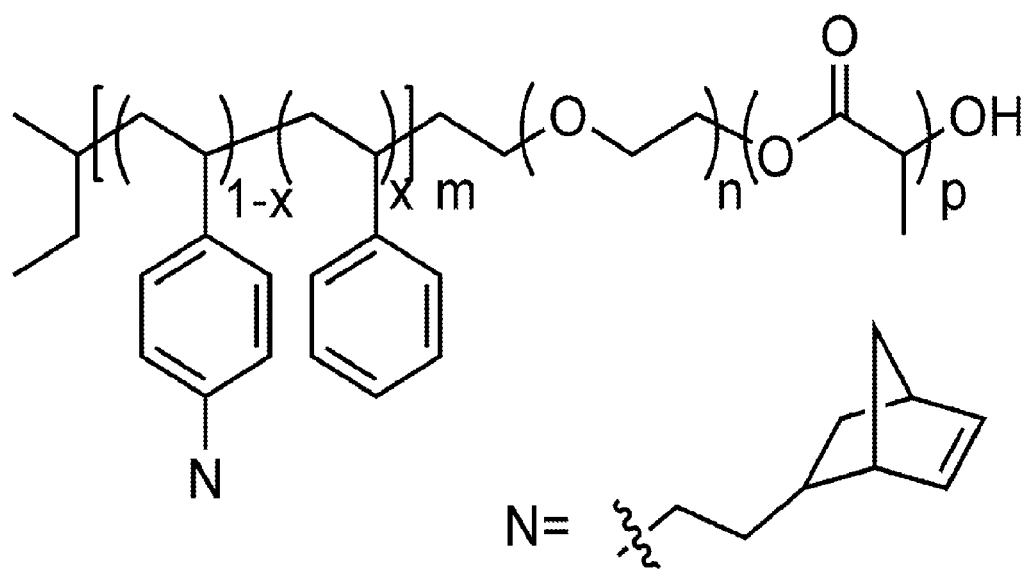
FIG. 19 shows a triblock terpolymer having a short hydrophilic middle PEO block.

Fouling may be overcome by using a triblock terpolymer having a middle short hydrophilic PEO block as shown in FIG. 19, which can be produced by sequential anionic polymerization of styrene/N and ethylene oxide and subsequently ring-opening polymerization of lactide.

The above results demonstrate that the PNS-PLA/DCPD membranes may be useful as ultrafiltration membranes.

Example 5

Figure 20:
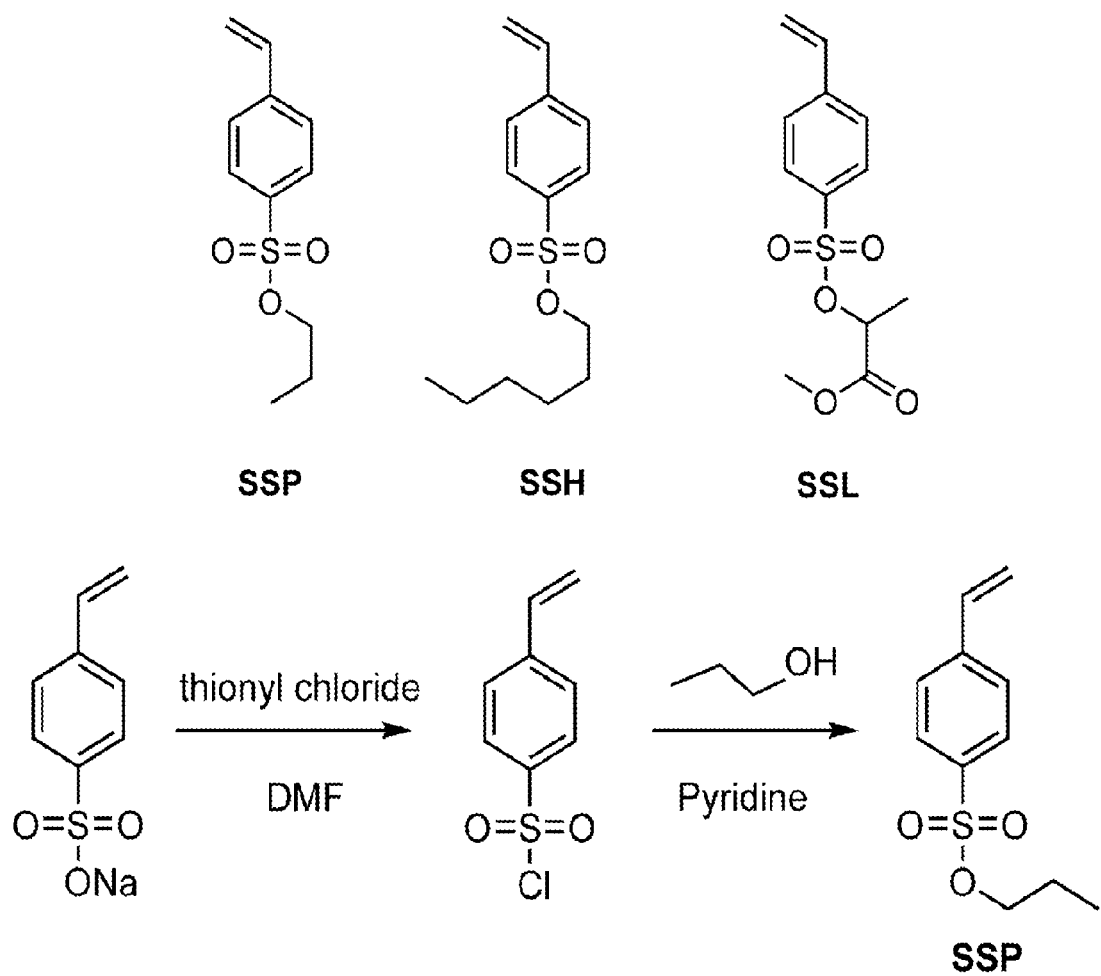
FIG. 20 shows sulfonated monomer candidates SSP, SSH, and SSL and a reaction scheme for synthesizing sulfonated monomer SSP.

Three sulfonated monomers were first synthesized by coupling styrene sulfonyl chloride with the corresponding alcohol, for example, n-propyl alcohol as shown in FIG. 20. Resulting monomers were purified by column chromatography using $CH_2Cl_2$ as the elution, and afterward NMR spectra indicated clean products. The synthesized SSH monomer was used in this example.

Figure 21:
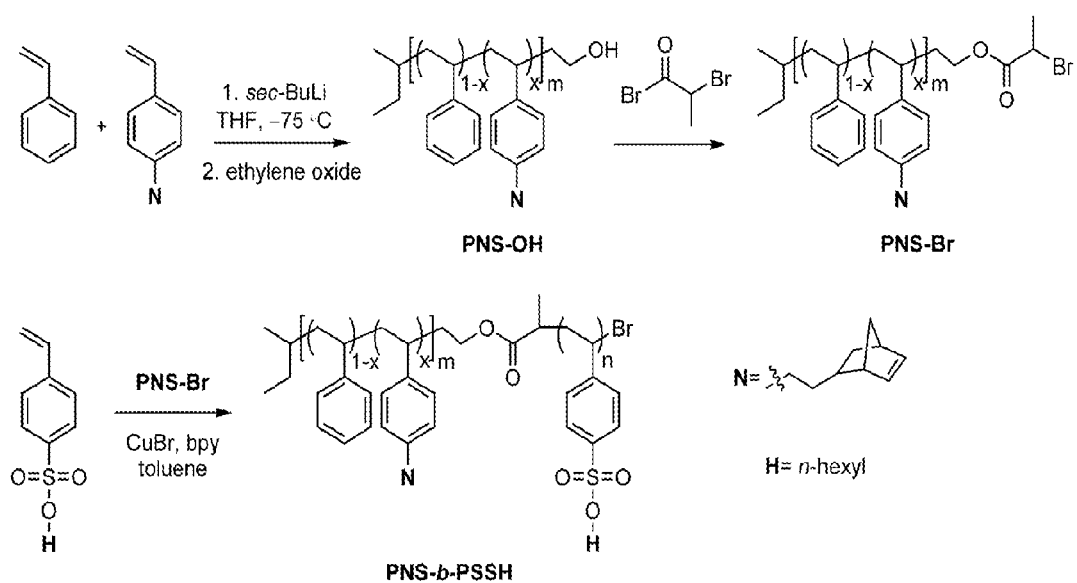
FIG. 21 shows a reaction scheme for synthesizing PNS-b-PSSH.

PNS-b-PSSH was then synthesized from the end-capped ATRP macroinitiator PNS-Br, as shown in FIG. 21. PNS-OH was firstly synthesized via anionic polymerization of styrene ("S") (5.6 g, mol) and norbornenylethylstyrene ("N") (1.0 g, mol) in THF (250 mL) initiated by sec-BuLi (0.55 mL, 1.3 M) at −75° C. for 0.5 h, followed by end-capping with ethylene oxide. The polymer was recovered by quenching with acidic methanol and precipitation in methanol. After drying at 50° C. under vacuum overnight, polymer was recovered in a yield of 95%. Size exclusion chromatography (SEC) indicated a number average molecular weight of 11.5 k and polydispersity index of 1.17. $^1$H NMR spectrum revealed an $M_n$ of 14.0 kg $mol^{-1}$ and a molar fraction of N to styrene is 0.076. PNS-OH was coupled with 2-bromo-propionyl bromide in $CH_2$ $Cl_2$ to form a macroinitiator for atom transfer radical polymerization in a quantitative conversion according to NMR end-group analysis.

Synthesis of PNS-b-PSSH was conducted via ATRP in toluene at 60° C. using a macroinitiator PNS-Br. Conversion of SSH was 90% according to NMR spectrum. Copolymer was precipitated in pentane and washed with methanol to get rid of possible PSSH homopolymer. PNS-b-SSH has a PSSH weight fraction of 70% with an overall molecular weight 46 kg mol$^{-1}$ according to the NMR spectrum. DSC characterization revealed the glass transition temperature of the PNS block to be 80° C., while the $T_g$ of PSSH was not observed likely due to decomposition in PSSH at higher temperatures. SAXS experiments proved microphase separation showing a primary peak consistent with a domain spacing of 26 nm.

Figure 22:
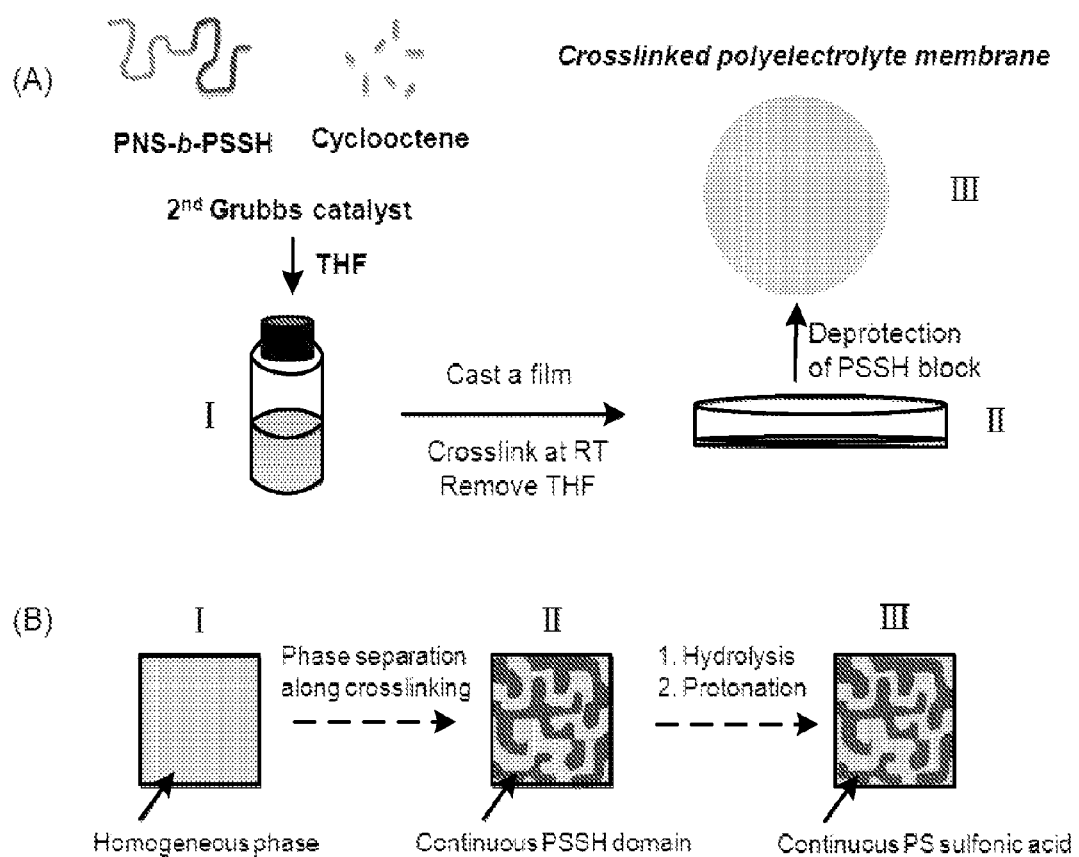
FIG. 22 shows a scheme for preparing crosslinked PNS-b-PSSH/COE membranes.

Membranes were then prepared using a homogeneous THF (7 parts, flexible ranging up to 16 parts) solution of PNS-PSSH (1), cyclooctene ("COE") (0.6 parts, tunable giving rise to different matrix strength), and 2$^{nd}$ generation Grubbs catalyst (0.003 parts), as shown in FIG. 22. After film-cast on an aluminum substrate, crosslinking at room temperature together with slow THF evaporation in a capped chamber gave rise to crosslinked film. Upon THF evaporation and annealing at 100° C. for 1 h, transparent flexible films were peeled off. Furthermore, films in the ester form were treated by NaOH and HCl aqueous solution for hydrolysis and protonation.

Figure 23:
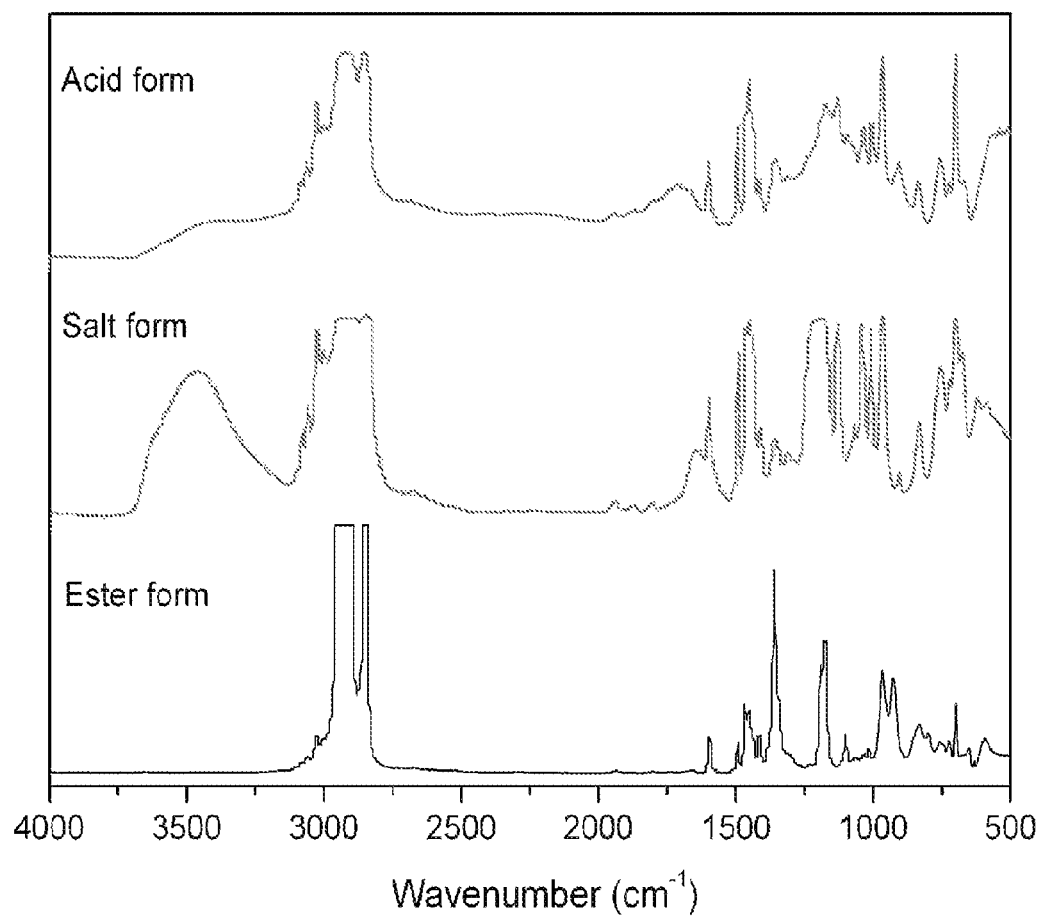
FIG. 23 shows IR spectra of crosslinked PNS-PSSH/COE films in ester form, salt form and acid form.
Figure 24:
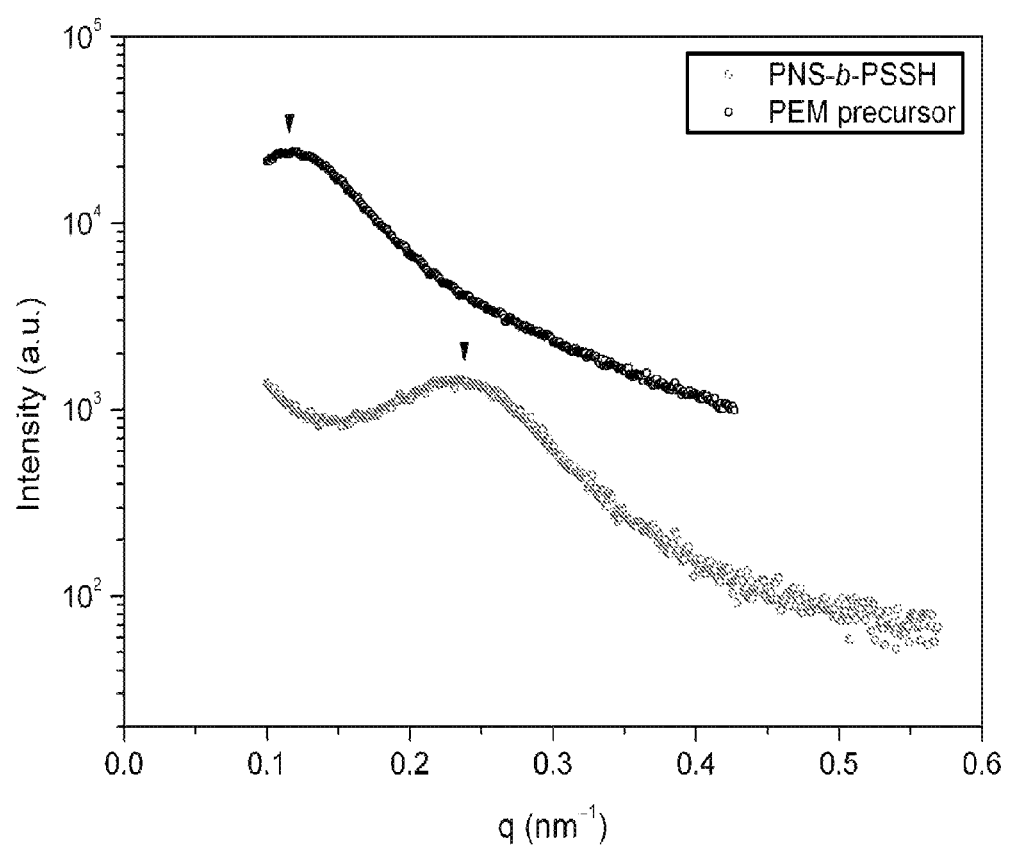
FIG. 24 shows SAXS profiles of crosslinked PNS-PSSH copolymer and PNS-PSSH:COE precursor membrane in the ester form.
Figure 25A:
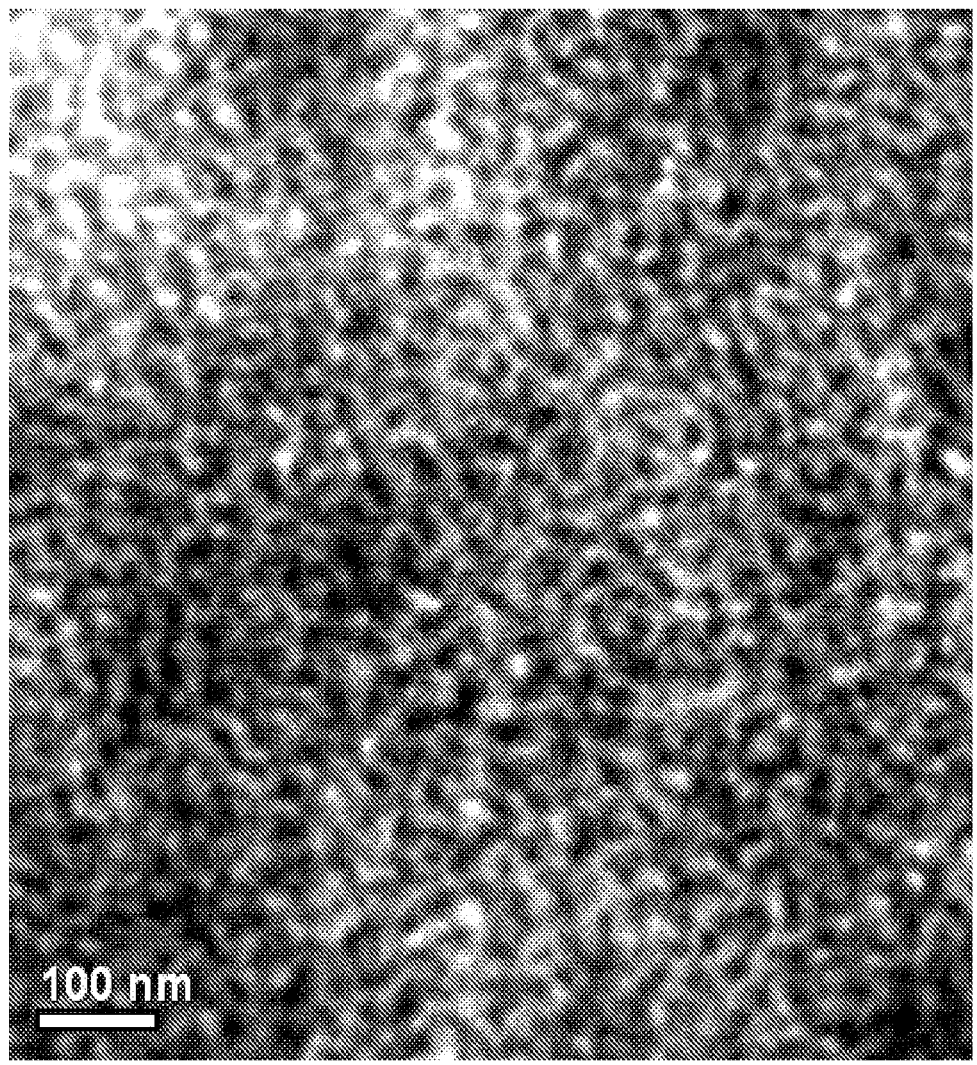
FIG. 25 shows transmission electron microscopy (TEM) microphotographs of a crosslinked PNS-PSSH/COE membrane (a) before and (b) after deprotection of PSSH.
Figure 25B:
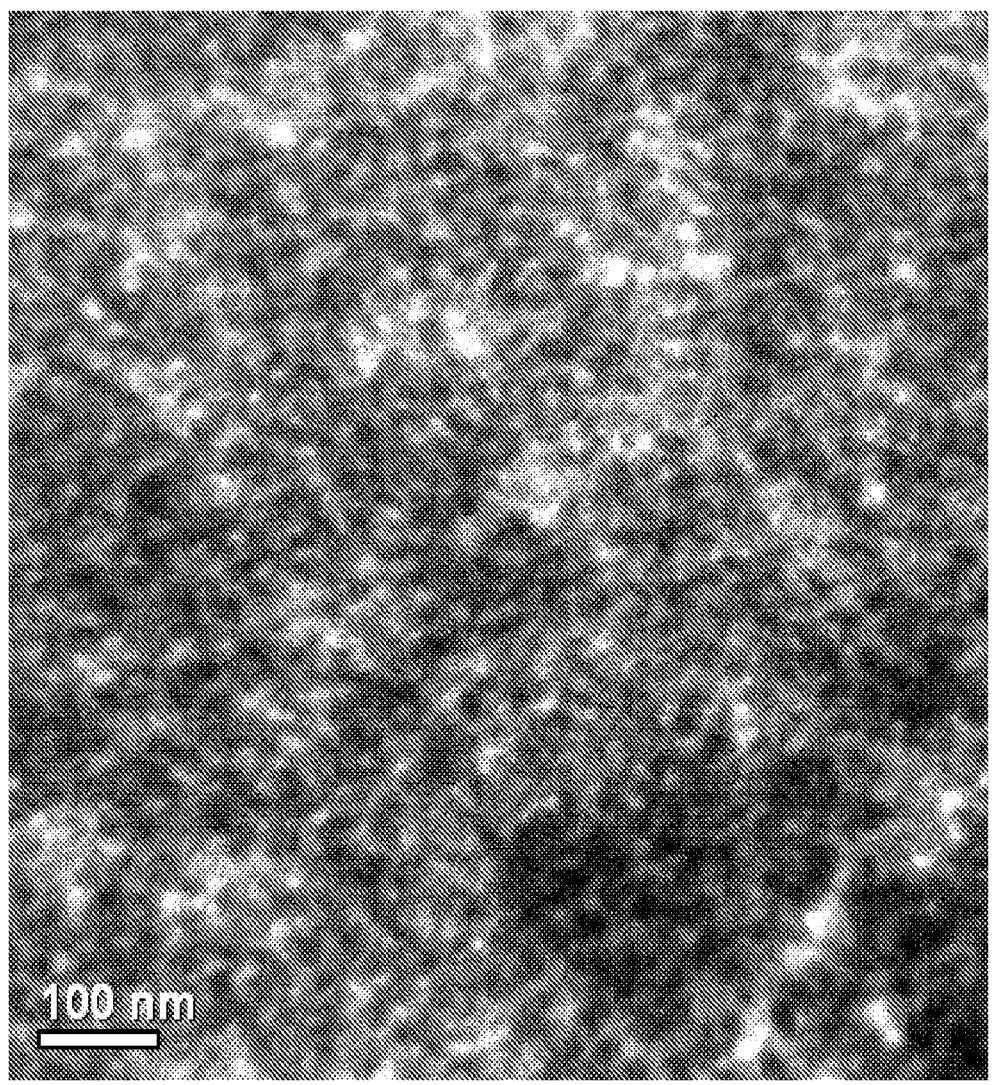

The films were then characterized using IR, SAXS and TEM. In the IR spectra (FIG. 23), a characteristic stretching peak for sulfonated ester, salt, and acid were seen after each treatment. Weight loss in the above procedures corresponded fairly well with theoretical values. FIG. 24 shows small angle X-ray scattering for PNS-PSSH copolymer (lower curve) and for a membrane in ester form (upper curve). Peaks can be seen in both curves. Small angle X-ray scattering of the precursor membrane in ester form showed characteristic structures that were well modeled by a bicontinuous microemulsions model, indicating domain spacing of 49 nm. After hydrolysis and protonation of the membrane, the membrane in acid form only showed the right half of the peak due to the detecting limitation of the instrument, which indicates the domain size slightly increased compared to the membrane in ester form. Microemulsion fitting gives a domain size of 51 nm. Transmission electron microscopy (TEM) analysis was conducted on a JOEL 1210 transmission electron microscope. Crosslinked membranes were microtomed at −140° C. into about 70 nm thick and stained with $OsO_4$ for 15 min. In TEM images of membranes before (FIG. 25(a)) and after (FIG. 25(b)) deprotection, the dark domains correspond to a matrix domain that is the crosslinked PS-PCOE composite stained by $OsO_4$. Resulting acid membranes swelled in water to about 30% in length at RT; in the dry state, films elongate greater than 200% in length at break, similar to the behavior of PCOE.

The membranes were dried at 60° C. under vacuum overnight. In order to remove the surface "skin" layer (<100 nm) on the resulting membranes (mainly PCOE), reactive $O_2$ ion etching was applied to remove about 200 nm of the surface. XPS analysis shows consistent sulfur content as predicted from the membrane composition (e.g., the atom ratio of sulfur to carbon is 0.03 which is very close to the theoretical value of 0.026). This appears to demonstrate the successful removal of a skin layer.

The selectivity of the crosslinked PNS-PSSH/PCOE acidic membranes for separating ammonia from mixed gas after reacting hydrogen and nitrogen was characterized and compared to Nafion, which is an uncrosslinked polymer membrane with sulfonic acid groups (Table 4). Compared to Nafion, the new acid PNS-PSSH membranes possess much higher ammonia selectivity over hydrogen and nitrogen in the mixed gas, which is important in the industrial ammonia separation process after reacting hydrogen and nitrogen, although much slower diffusion resulted due to nonporous features and limited swelling in the membrane. The derived membranes from PNS-PSSH/COE may also be useful as proton exchange membranes for fuel cell applications.

TABLE 4

Selectivity of crosslinked PNS-PSSH/COE membrane (acid form) and Nafion in ammonia separation from mixed gas with hydrogen and nitrogen.

| Membrane | Diffusion coefficient (×10$^4$ cm$^2$/s) | | | Selectivity | |
| --- | --- | --- | --- | --- | --- |
| | $H_2$ | $N_2$ | $NH_3$ | $NH_3/H_2$ | $NH_3/N_2$ |
| Nafion 117 | 0.017 | 0.016 | 27 | >1000 | >1000 |
| +1 atm $NH_3$ | 23 | 21 | 27 | 1.17 | 1.29 |
| PCOE-PSS | 0.0003 | 0.0003 | 0.05 | >150 | >150 |
| +1 atm $NH_3$ | 0.0005 | 0.0004 | 0.05 | >100 | >100 |

Example 6

Figure 26:
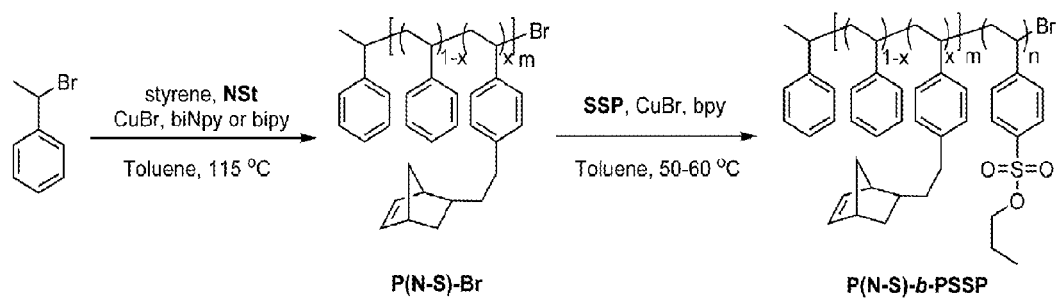
FIG. 26 shows a reaction scheme for synthesizing PNS-PSSP copolymer precursor.

SSP monomer was first synthesized as described in Example 5. PNS-PSSP copolymer was then synthesized using sequential ATRP reactions, as shown in FIG. 26. After the first polymerization, CuBr catalyst was removed by passing through an alumina column, and the polymer was precipitated in methanol, followed by drying under vacuum. In the second polymerization, CuBr catalyst was removed using Dowex ion exchange resins, resulting copolymers were precipitated in cold pentane, and dried under vacuum. Quantitative conversion of SSP in the second step was obtained. Block copolymers with tunable molecular weight can be achieved by controlling the stoichiometry in the polymerization. PEM precursor membranes were fabricated in the same way as demonstrated for PNS-PSSH in Example 5. The membranes are summarized in Table 5. Crosslinkable norbornene groups in the copolymers were 5-10 units per polymer chain (minimum) in each polymer backbone. However, a potential increase in norbornene functionality leads to high crosslinking density, and more rigid membranes. Tensile tests for the membranes using COE as a crosslinkable monomer demonstrated the elastic feature in the resulting membranes. In addition, by incorporating DCPD/COE (1:1) in the crosslinking process, less elastic membranes were obtained that almost did not swell in water or methanol.

TABLE 5

PNS-PSSP films.

| | $M_n$(k) H NMR | BCP:COE[1] Mass ratio | PSSP (wt %) | Domain size[2] (nm) |
| --- | --- | --- | --- | --- |
| PNS-PSSP_1 | 12-24 | — | 66.7 | 23.5 |
| Film 1e[3] | — | 3:2 | 40.0 | 37.3 |
| Film 1a | — | — | — | 41.5 |
| PNS-PSSP_2 | 6-12 | — | 66.7 | 15.0 |
| Film 2e | — | 3:2 | 40.0 | 17.7 |
| Film 2a | — | — | — | 22.6 |
| PNS-PSSP_3 | 2-4 | — | 66.7 | n.a. |
| Film 3e | — | 3:2 | 40.0 | 10.5 |
| Film 3a | — | — | — | 14.4 |

Figure 27:
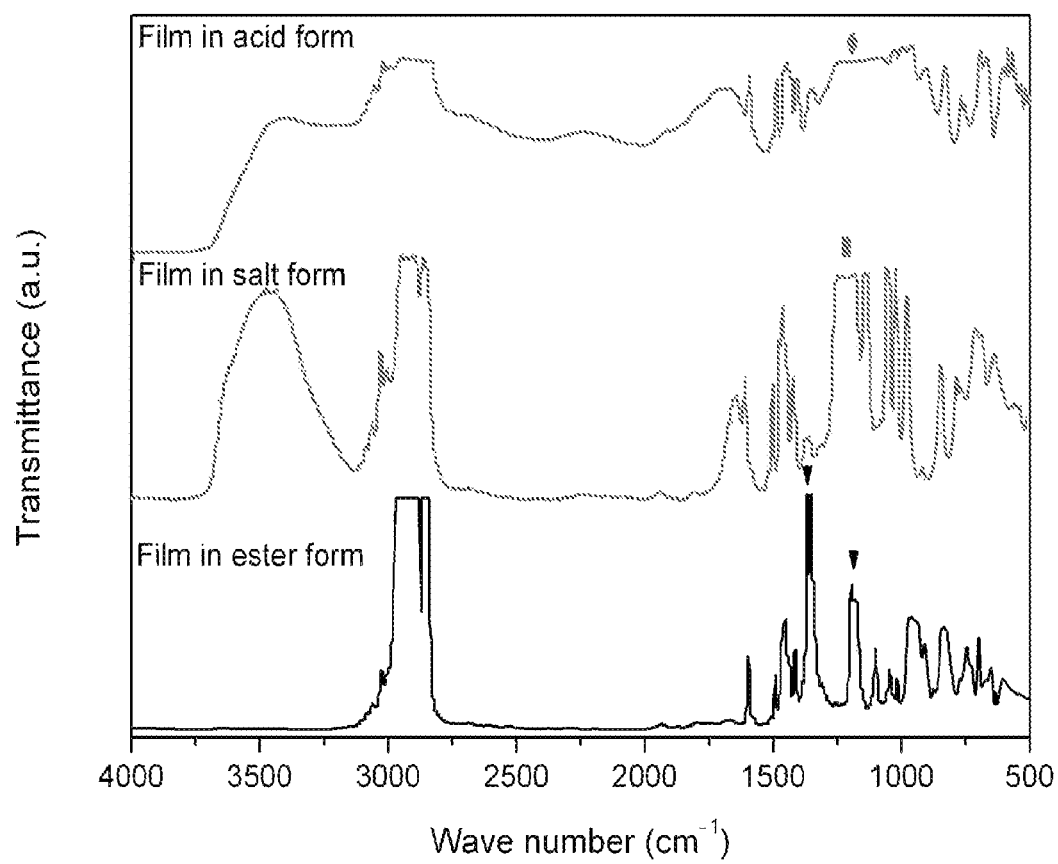
FIG. 27 shows IR spectra of crosslinked PNS-PSSP/COE films in ester form, salt form and acid form.

[1]Catalyst loading was about 0.4 wt % relative to overall mass of copolymer and COE
[2]The domain size was calculated from small angle x-ray scattering profiles
[3]The "e" and "a" indicate films in the ester form and in the acid form respectively The protecting group was hydrolyzed using 30 wt % NaOH in the H2O/MeOH (5:6) mixture, then the film was protonated in 20 wt % HCl aqueous solution. IR spectra indicated complete conversion in each step (FIG. 27).

Figure 28A:
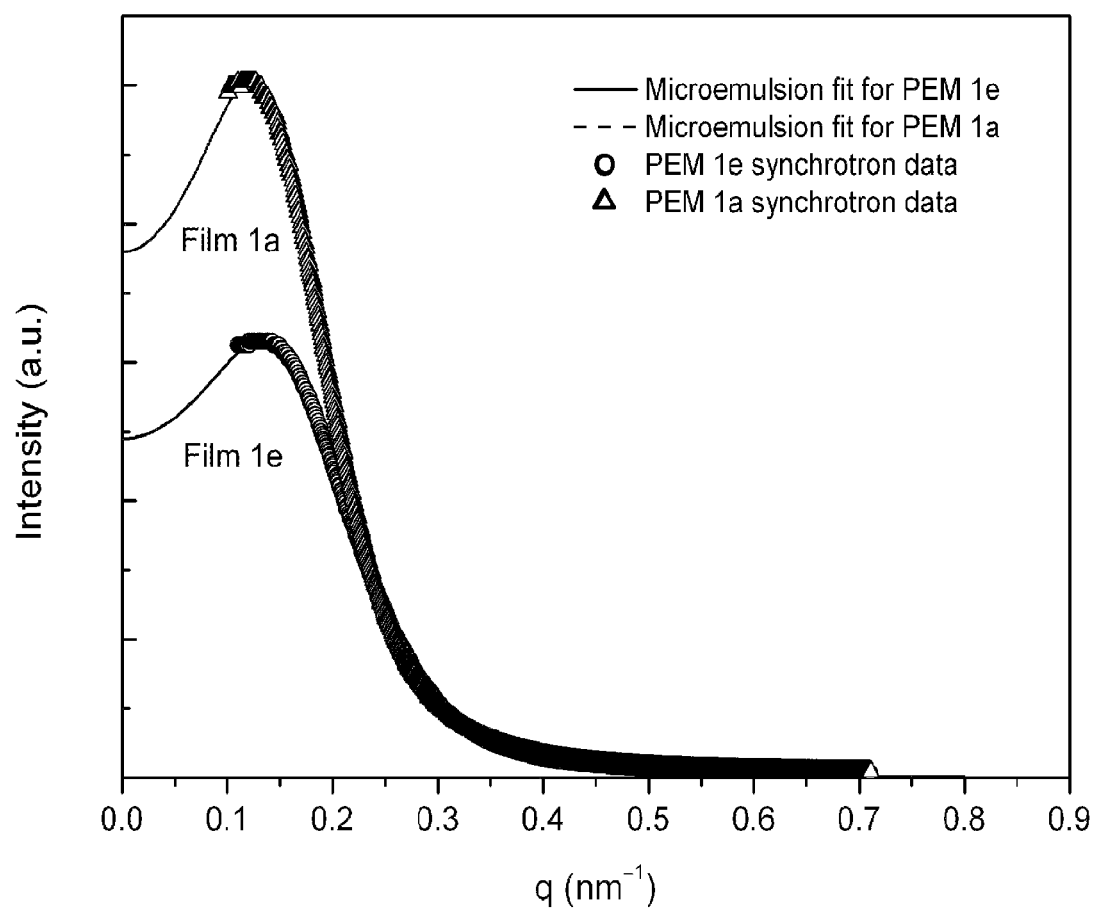
FIG. 28 shows synchrotron scattering and microemulsion fit for crosslinked PNS-PSSP/COE films in ester form and acid form.
Figure 28B:
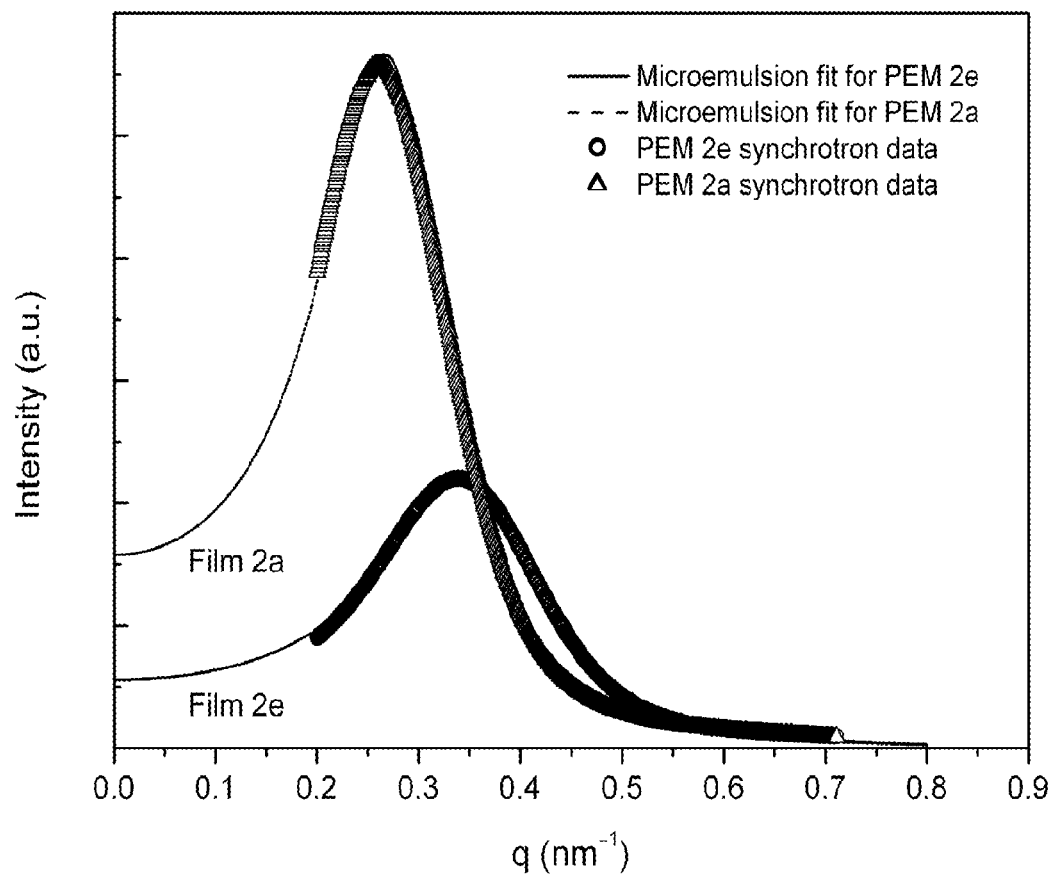
Figure 28C:
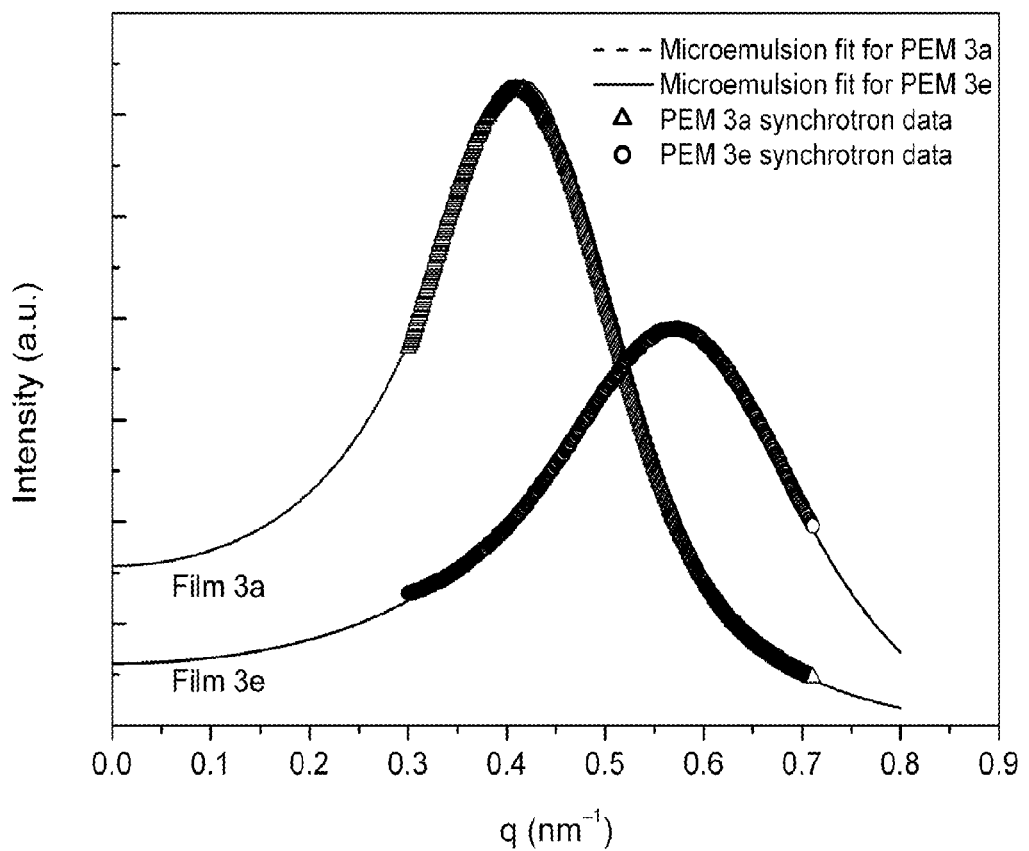

In Table 5, the domain spacing in each membrane was calculated from the peak position of the scattering profiles. Furthermore, synchrotron scattering was carried out on the membranes, and domain spacing (D), amphiphilicity factor ($f_a$), and correlation length ($\xi$) were calculated by fitting each profile with the scattering equation of bicontinuous microemulsion (FIG. 28).

The calculated domain spacing (D), amphiphilicity factor ($f_a$), and correlation length ($\xi$) for the crosslinked PNS-PSSP/COE membranes are summarized in Table 6. Domain spacing increased slightly after deprotection, which became more significant in membrane 3 with small domain size. This phenomenon may be attributed to the strong electrostatic repulsion of polymer electrolytes in the more confined domain.

TABLE 6

Calculated domain spacing (D) and amphiphilicity factor ($f_a$) and correlation length ($\xi$) for the crosslinked PNS-PSSP/COE films.

| | D (nm) | $f_a$ | $\xi$ |
|---|---|---|---|
| Film 1e | 37.3 | −0.48 | 9.99 |
| Film 1a | 41.5 | −0.50 | 11.38 |
| Film 2e | 17.7 | −0.87 | 10.46 |
| Film 2a | 22.6 | −0.85 | 12.57 |
| Film 3e | 10.5 | −0.86 | 6.12 |
| Film 3a | 14.4 | −0.86 | 8.32 |

Figure 29:
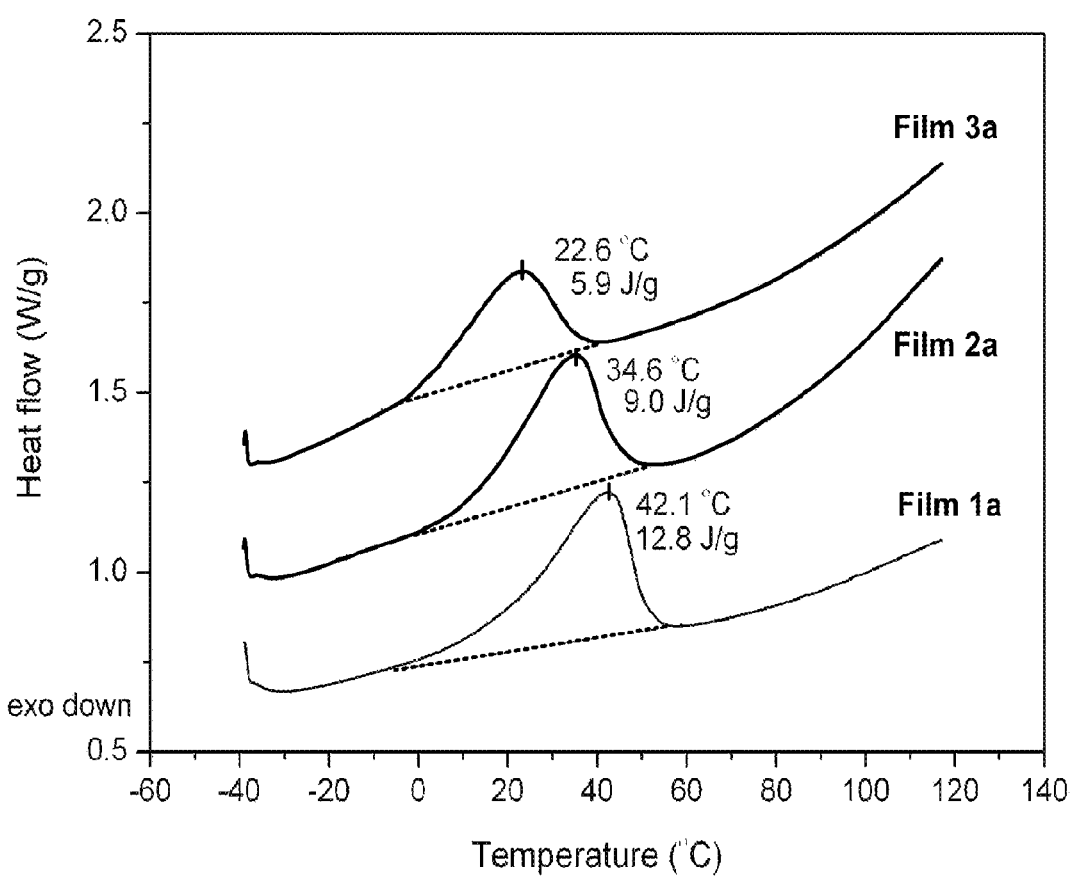
FIG. 29 shows differential scanning calorimetry (DSC) analysis of crosslinked PNS-PSSP/COE films in acid form.

DSC analysis of acid membranes (FIG. 29) indicated confined crystallization of PCOE in the crosslinked matrix phase, while no detectable glass transition temperature was seen because the $T_g$ or $T_m$ of the sulfonated PS block was higher than 200° C. However, an increase in the heat flow and melting point of the PCOE domain was consistent with an increase in the domain size.

Figure 30:
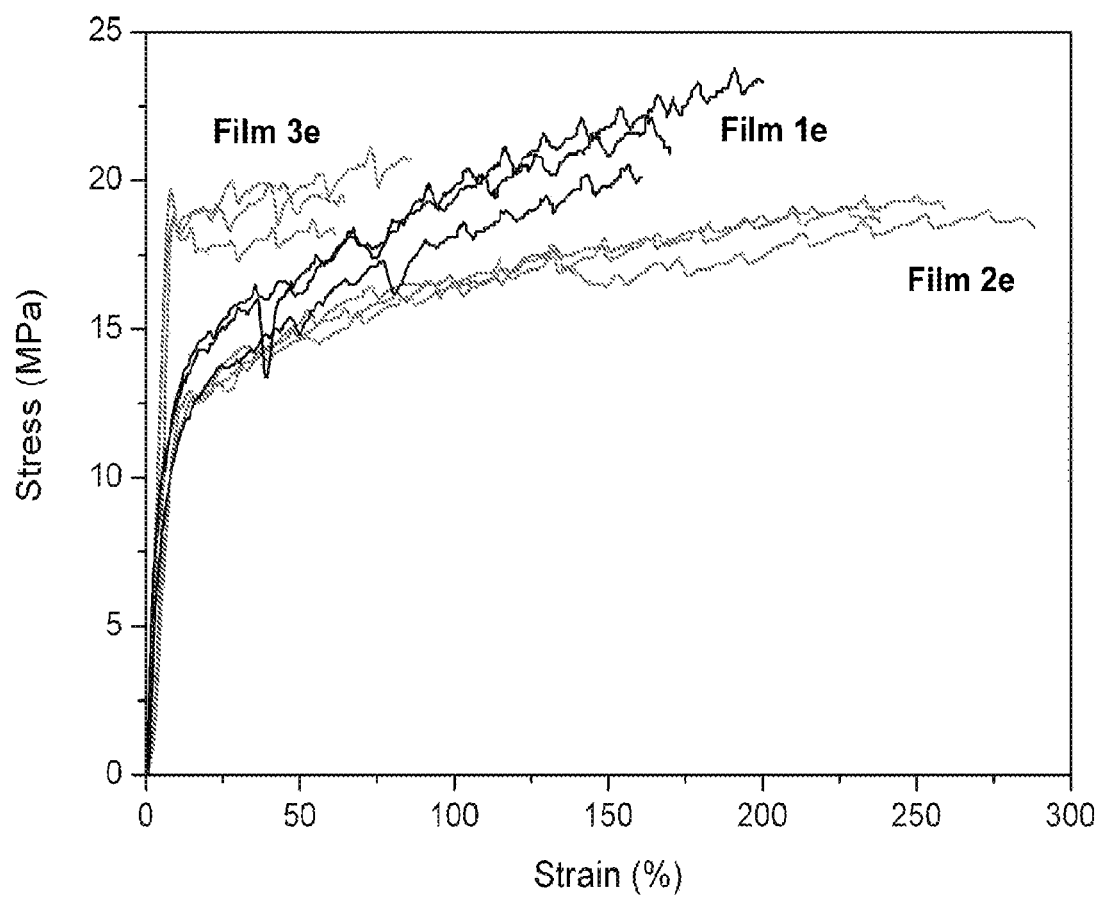
FIG. 30 shows tensile test results for PNS-PSSP/COE films in ester form.

Tensile tests (FIG. 30) suggested membranes in the ester form are robust, similar to the PCOE materials. After deprotection, similar tensile behavior was seen. However, those membranes are solvent resistant and show limited swelling (up to 30% in length) in water, superior to those uncrosslinked materials, especially for membrane 3 with the smallest domain size.

Figure 31A:
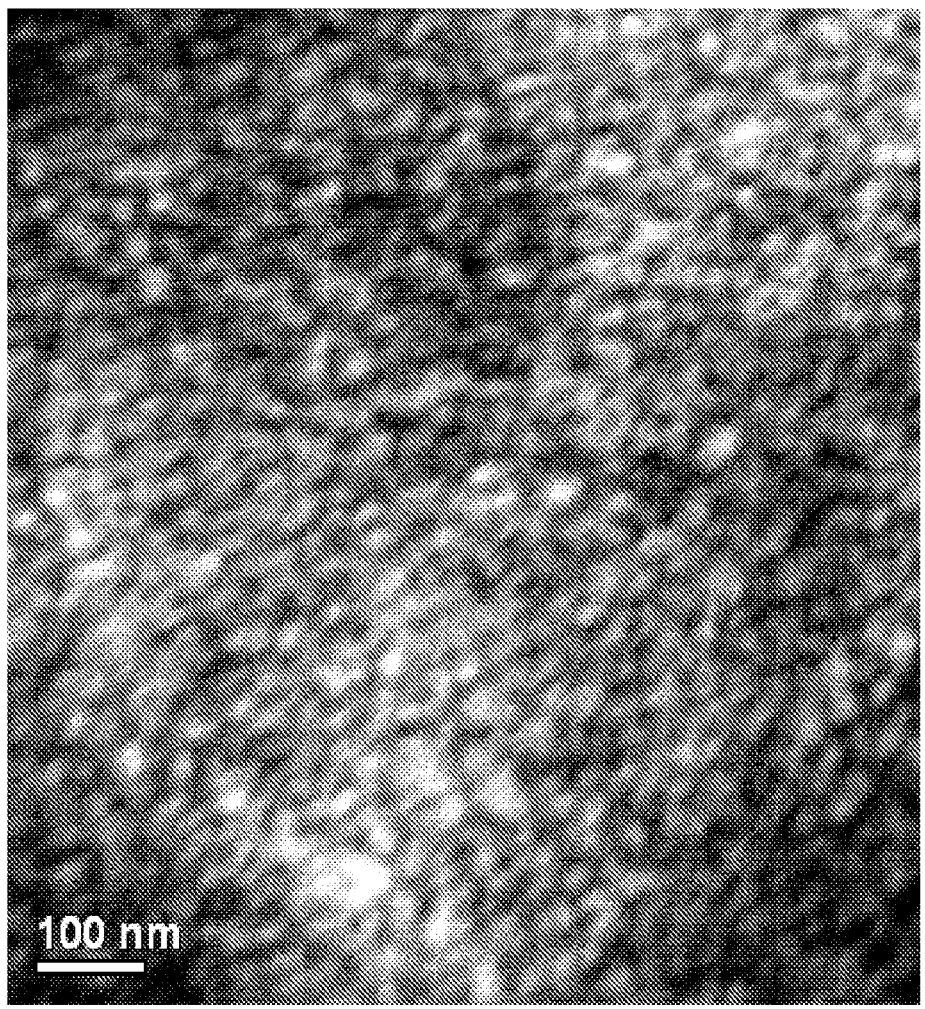
FIGS. 31(a) and (b) are TEM microphotographs of crosslinked PNS-PSSP/COE Films 1a and 2a that were stained by 4 wt % $OsO_4$ aqueous solution for 15 min.
Figure 31B:
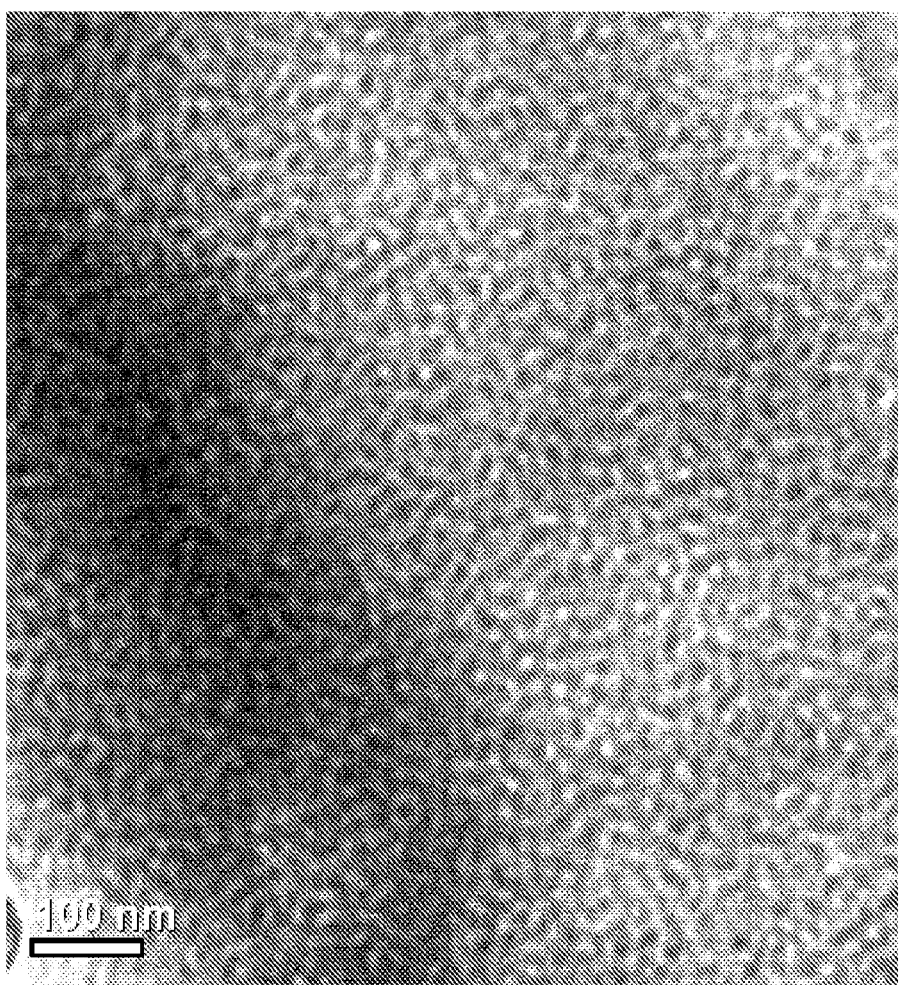
FIGS. 31(c) and (d) are TEM microphotographs of crosslinked PNS-PSSP/COE Films 2a and 3a that were stained with saturated $Pb(acetate)_2$ aqueous solution for 12 h.
Figure 31C:
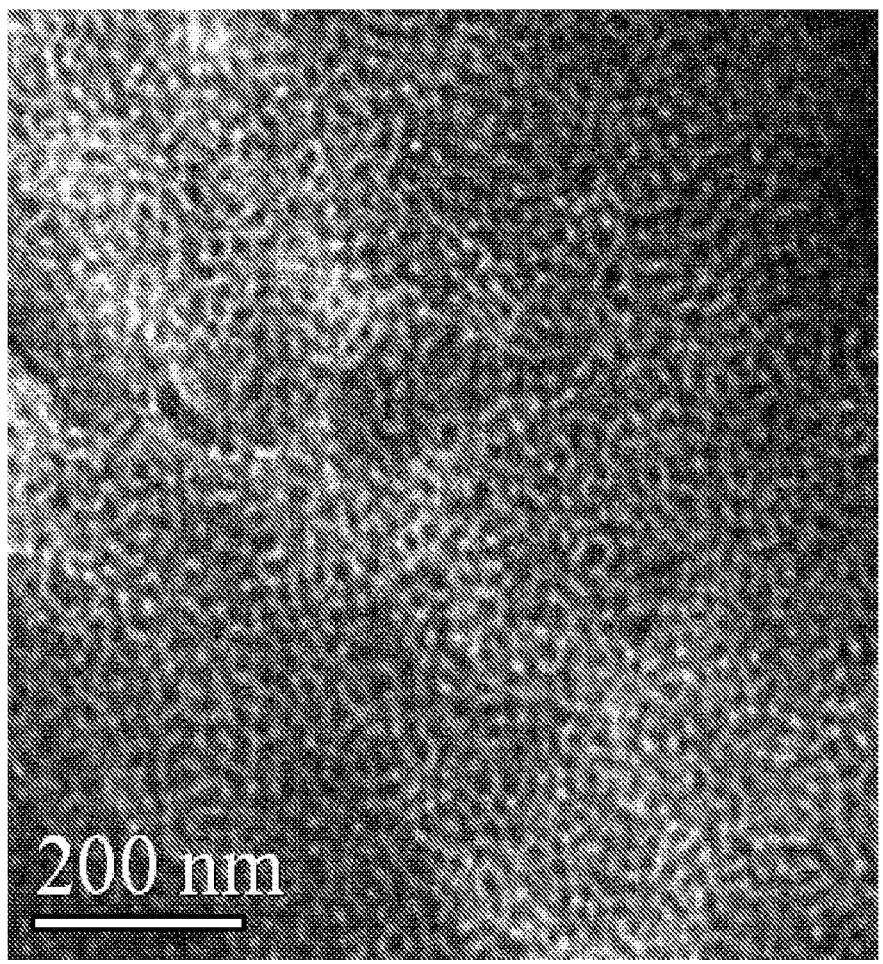
Figure 31D:
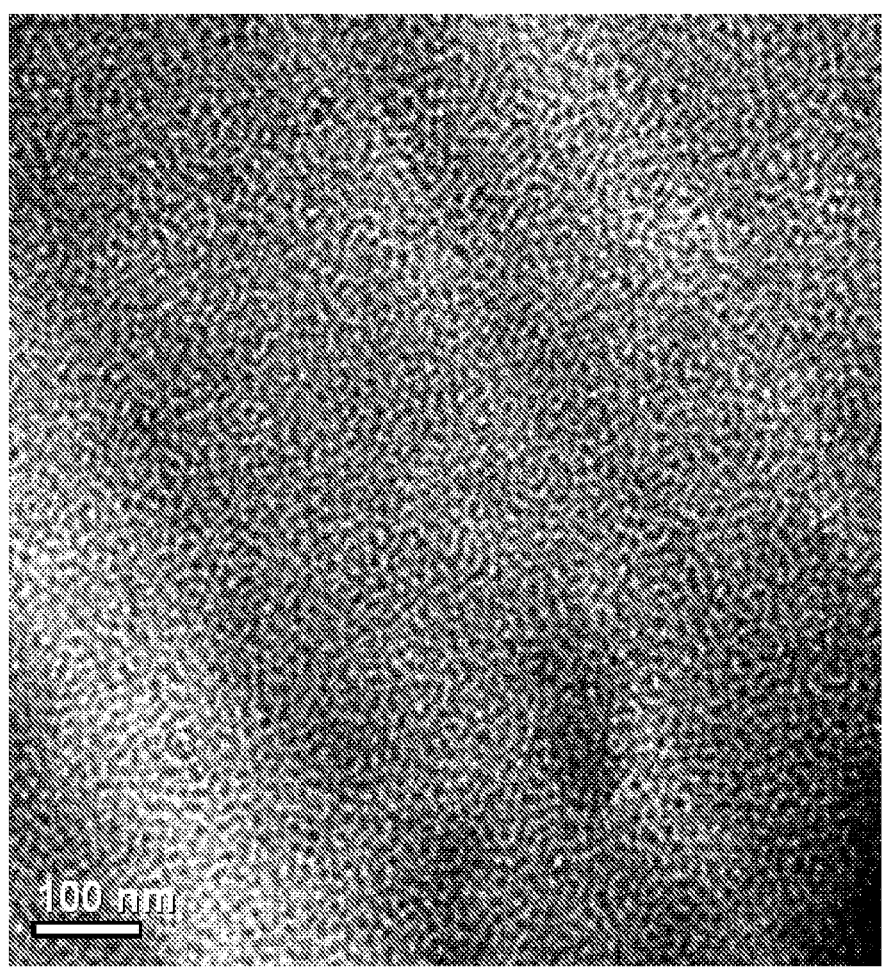

FIGS. 31(a) and (b) show TEM microphotographs of Films 1a and 2a that were stained by 4 wt % OsO$_4$ aqueous solution for 15 min; FIGS. 31(c) and (d) show TEM microphotographs of Films 2a and 3a that were stained with saturated Pb(acetate)$_2$ aqueous solution for 12 h. Samples were cryo-microtomed at −140° C. to 70 nm thick slices. In FIGS. 31(a) and (b), crosslinked PNS/PCOE domain was stained to appear dark; in FIGS. 31(c) and (d), bright domains were unstained crosslinked PNS/PCOE.

The TEM images directly proved the co-continuous morphology in crosslinked PNS-PSSP membranes. Those membranes may have a high proton conductivity but with less methanol crossover due to the limited swelling. Using post-fluorination reaction, good thermal and chemical stability may be obtained. Those membranes may be useful as proton conductive membranes in direct methanol fuel cells.

Example 7

Figure 32:
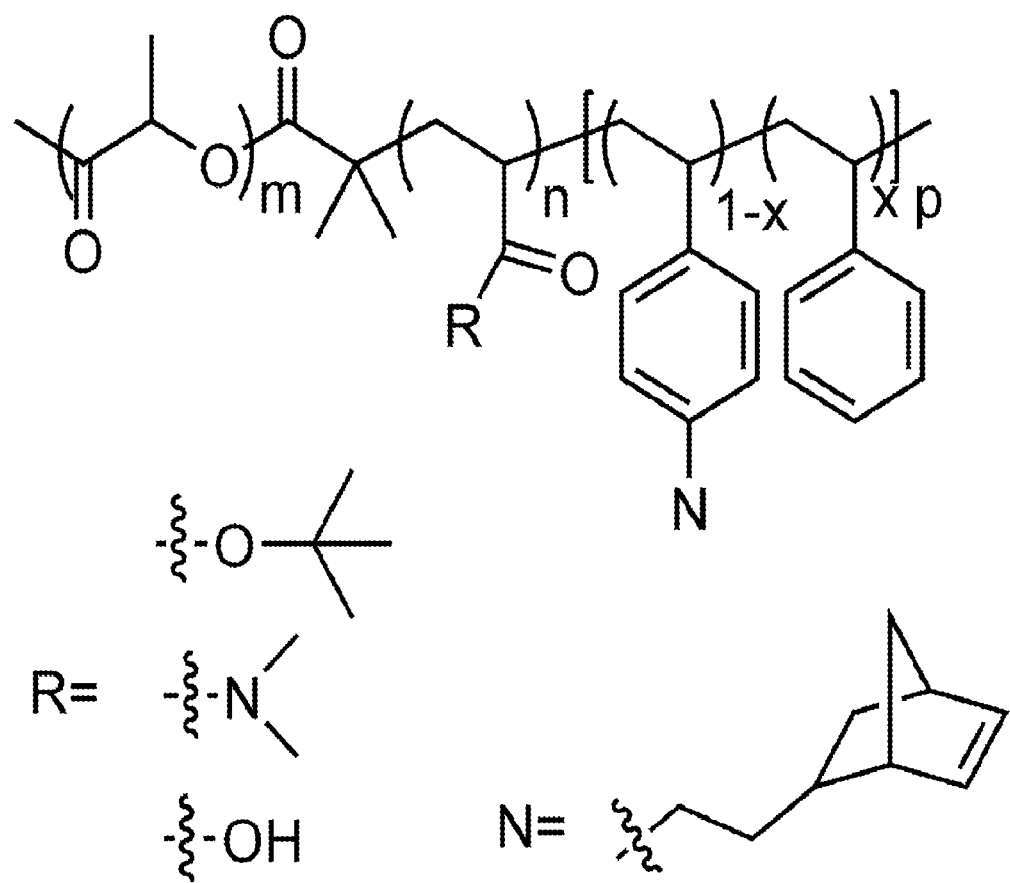
FIG. 32 shows triblock terpolymers (PNS-PX-PLA) possessing a short middle block (PX).

Triblock terpolymers (PNS-PX-PLA, shown in FIG. 32) possessing a short middle block (PX) were applied in the same crosslinking process for diblock copolymer (PNS-PLA) as described in Example 1. Any compatible mid-block can be adopted to decorate the pore wall leading to hydrophilic percolated pores or functional pore walls for other applications. The triblock copolymers were synthesized from a macromolecular chain transfer reagent PLA-TC followed by sequential RAFT polymerization of PDMA or PtBA and styrene/N. PAA functionality was obtained from hydrolysis of the PtBA block. The resulting mesoporous membranes were confirmed by SEM, SAXS, and IR. Water-wettable functionality enables sensitive size selections such as biomolecular separation, and functionality of pore walls opens the possibility for selective removal of small molecules by designed chemical reaction or physical adsorption, Nanoporous water-wettable membranes where the pore walls are coated with poly(dimethyl acrylamide) using an ABC triblock terpolymer can be used in ultrafiltration or for sequestering of metals for water clean-up (e.g., arsenic) or for generating catalytic membrane reactors.

A number of embodiments of the invention have been described. Nevertheless, it will be understood that various modifications may be made without departing from the spirit and scope of the invention. Accordingly, other embodiments are within the scope of the following claims.

What is claimed is:

1. A process for preparing a polymer composite comprising reacting (a) a multi-functional monomer and (b) a block copolymer comprising (i) a first block and (ii) a second block that includes a functional group capable of reacting with the multi-functional monomer, to form a crosslinked, nano-structured, bicontinuous composite comprising a continuous matrix phase and a second continuous phase comprising the first block of the block copolymer, wherein the multi-functional monomer comprises a metathesis-reactive monomer and reacts with the second block of the block copolymer in the presence of a metathesis catalyst.

2. A process according to claim 1, further comprising treating the composite to selectively remove the first block of the block copolymer in the second continuous phase to form a plurality of pores.

3. A process according to claim 2, wherein the pores have an average pore diameter of about 1 to about 500 nanometers.

4. A process according to claim 2, wherein the pores have an average pore diameter of about 10 to about 50 nanometers.

5. A process according to claim 2, comprising treating the composite with a chemical etchant.

6. A process according to claim 1, wherein the multi-functional monomer is a multi-functional, ethylenically unsaturated monomer.

7. A process according to claim 1, wherein the metathesis-reactive monomer comprise a cyclic olefin.

8. A process according to claim 7, wherein the cyclic olefin is selected from the group consisting of dicyclopentadiene, cyclooctene, and combination thereof.

9. A process according to claim 7, wherein the metathesis catalyst comprises a functional-group tolerant metathesis catalyst.

10. A process according to claim 9, wherein the functional-group tolerant catalyst comprises second generation Grubbs catalyst.

11. A process according to claim 1, wherein the first block of the block copolymer is selected from the group consisting of a polylactide block, a sulfonated polystyrene block, and combinations thereof.

12. A process according to claim 1, wherein the second block of the block copolymer includes an ethylenically unsaturated functional group capable of reacting with the multi-functional monomer.

13. A process according to claim 1, wherein the second block of the block copolymer comprises a norbornenyl group capable of reacting with the multi-functional monomer.

14. A process according to claim 1, wherein the second block of the block copolymer comprises a copolymer of styrene and norbornenylethylstyrene.

15. A process according to claim 1, wherein the block copolymer further comprises a third block.

16. A process according to claim 1, wherein (a) the multi-functional monomer is selected from the group consisting of dicyclopentadiene, cyclooctene, and combination thereof; and (b) the block copolymer is selected from the group consisting of a polylactide-poly (styrene-co-norbornenylethylstyrene) block copolymer, a sulfonated polystyrene-poly(styrene-co-norbornenylethylstyrene) block copolymer, a polylactide-poly(dimethyl acrylamide)-poly (styrene-co-norbornenylethylstyrene) block copolymer, and combinations thereof.

17. A process according to claim 1, comprising reacting the multi-functional monomer and the block copolymer in the presence of a homopolymer polylactide.

18. A process according to claim 2, wherein the composite is in the form of a nano-porous or barrier membrane.

19. A process according to claim 18, wherein the membrane is a water purification membrane, ammonia separation membrane or fuel cell membrane.

20. A composition comprising a crosslinked, nano-structured, bicontinuous composite that includes a continuous matrix phase and a second continuous phase, wherein the continuous matrix phase comprises nanometer-sized domains, said nanometer-sized domains comprise a second block of a block copolymer, and the second continuous phase comprises a first block of the block copolymer, wherein the first block is selected from the group consisting of a polylactide block, a sulfonated polystyrene block, and combinations thereof.

21. A composition according to claim 20, wherein the composite comprises a plurality of pores.

22. A composition according to claim 21, wherein the pores have an average pore diameter of about 1 to about 500 nanometers.

23. A composition according to claim 21, wherein the pores have an average pore diameter of about 10 to about 50 nanometers.

24. A composition according to claim 21, wherein the composite is in the form of a nano-porous or barrier membrane.

25. A composition according to claim 24, wherein the membrane is a water purification membrane, ammonia separation membrane or fuel cell membrane.

26. A composition comprising a crosslinked, nano-structured, bicontinuous composite that includes a continuous matrix phase and a second continuous phase, wherein the composite comprises the reaction product of (a) a multi-functional monomer and (b) a block copolymer comprising (i) a first block and (ii) a second block that includes a functional group capable of reacting with the multi-functional monomer, and the second continuous phase comprises the first block of the block copolymer, wherein the multi-functional monomer comprises a metathesis-reactive monomer and is capable of reacting with the second block of the block copolymer in the presence of a metathesis catalyst.

* * * * *

UNITED STATES PATENT AND TRADEMARK OFFICE
CERTIFICATE OF CORRECTION

PATENT NO. : 8,420,704 B2  
APPLICATION NO. : 12/669857  
DATED : April 16, 2013  
INVENTOR(S) : Marc Hillmyer Page 1 of 1

It is certified that error appears in the above-identified patent and that said Letters Patent is hereby corrected as shown below:

On the Title Page, Column 2, Item [56] line 17, delete "methstyrene" and insert --methylstyrene--, therefor.

In the Specifications:

Column 1, line 9, delete "X371" and insert --§371--, therefor.

Column 1, lines 18-21, delete "This application was funded, at least in part, by the U.S. Department of Energy (Grant No. DE-FG02-05ER46261). Accordingly, the federal government may have certain rights to this application." and insert --This invention was made with government support under DE-FG02-05ER46261 awarded by the U.S. Department of Energy. The government has certain rights in the invention.--.

In the Claims:

Column 16, line 51, Claim 9, delete "claim 7," and insert --claim 1,--, therefor.

Signed and Sealed this  
Third Day of September, 2013

Teresa Stanek Rea  
*Acting Director of the United States Patent and Trademark Office*

UNITED STATES PATENT AND TRADEMARK OFFICE
CERTIFICATE OF CORRECTION

PATENT NO. : 8,420,704 B2  
APPLICATION NO. : 12/669857  
DATED : April 16, 2013  
INVENTOR(S) : Hillmyer et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 496 days.

Signed and Sealed this

First Day of September, 2015

Michelle K. Lee
*Director of the United States Patent and Trademark Office*